(12) United States Patent
Nagao

(10) Patent No.: US 11,874,694 B2
(45) Date of Patent: Jan. 16, 2024

(54) SEMICONDUCTOR DEVICE AND SEMICONDUCTOR DEVICE SYSTEM

(71) Applicant: Rohm Co., Ltd., Kyoto (JP)

(72) Inventor: Kei Nagao, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/791,634

(22) PCT Filed: Dec. 29, 2020

(86) PCT No.: PCT/JP2020/049287
§ 371 (c)(1),
(2) Date: Jul. 8, 2022

(87) PCT Pub. No.: WO2021/140998
PCT Pub. Date: Jul. 15, 2021

(65) Prior Publication Data
US 2023/0066399 A1 Mar. 2, 2023

(30) Foreign Application Priority Data

Jan. 10, 2020 (JP) ................................. 2020-003169

(51) Int. Cl.
*G06F 1/08* (2006.01)
*G06F 1/28* (2006.01)
*G06F 13/40* (2006.01)

(52) U.S. Cl.
CPC .................. *G06F 1/08* (2013.01); *G06F 1/28* (2013.01); *G06F 13/4022* (2013.01)

(58) Field of Classification Search
CPC ... G11C 7/222; G11C 7/22; G11C 2207/2254; G11C 29/023; G11C 29/12015;
(Continued)

(56) References Cited

U.S. PATENT DOCUMENTS 8,000,430 B2 * 8/2011 Vlasenko .................. H03L 7/10
327/155
8,315,128 B1 * 11/2012 Wilson ...................... G11B 5/09
369/59.19

(Continued)

FOREIGN PATENT DOCUMENTS

JP 2009200661 9/2009
JP 2012203866 10/2012
(Continued)

OTHER PUBLICATIONS

International Search Report in International Appln. No. PCT/JP2020/049287, dated Apr. 6, 2021, 5 pages (with English Translation).

*Primary Examiner* — Faisal M Zaman
(74) *Attorney, Agent, or Firm* — Fish & Richardson P.C.

(57) ABSTRACT

A semiconductor device includes an oscillator configured to generate a first clock signal, a first terminal via which an input clock signal is fed in from the outside, a first counter configured to count a clock signal based on the first clock signal between edges in the input clock signal, and a controller configured to send to the oscillator an instruction to adjust the frequency of the first clock signal based on the result of comparison of the count value by the first counter with an expected value.

14 Claims, 18 Drawing Sheets

(58) Field of Classification Search
CPC ......... G11C 7/1066; H03L 7/085; H03L 7/08;
H03L 7/0814; G06F 1/08; G06F 13/4273;
G06F 1/10; G06F 13/1689
USPC ........ 327/158, 156, 151; 331/34; 365/233.1,
365/233.11, 233.12, 236; 375/376, 354,
375/373; 713/500–503
See application file for complete search history.

(56) References Cited

U.S. PATENT DOCUMENTS

| | | | | |
|---|---|---|---|---|
| 9,147,376 | B2* | 9/2015 | Lee | G09G 3/3688 |
| 2002/0102957 | A1* | 8/2002 | Tseng | H03J 7/02 |
| | | | | 455/257 |
| 2006/0009184 | A1* | 1/2006 | Goldman | H03L 7/093 |
| | | | | 455/260 |
| 2006/0017510 | A1* | 1/2006 | Momii | H03L 7/08 |
| | | | | 331/1 A |
| 2006/0158259 | A1* | 7/2006 | Ishizaka | H03L 7/18 |
| | | | | 331/10 |
| 2007/0101177 | A1* | 5/2007 | Kuroki | G06F 1/06 |
| | | | | 713/500 |
| 2007/0200609 | A1* | 8/2007 | Kang | H03K 5/15033 |
| | | | | 327/296 |
| 2008/0094115 | A1* | 4/2008 | Ishikawa | H03L 7/0816 |
| | | | | 327/158 |
| 2009/0243678 | A1* | 10/2009 | Mizuhashi | H03L 7/0814 |
| | | | | 327/158 |
| 2009/0316847 | A1* | 12/2009 | Thomsen | H03L 7/0991 |
| | | | | 375/373 |
| 2012/0249192 | A1* | 10/2012 | Matsushita | G06F 1/08 |
| | | | | 327/115 |
| 2013/0033189 | A1* | 2/2013 | Park | H05B 45/10 |
| | | | | 315/209 R |
| 2013/0278175 | A1* | 10/2013 | Ascorra | H05B 45/38 |
| | | | | 315/297 |
| 2014/0247074 | A1 | 9/2014 | Matsushita | |
| 2016/0248247 | A1 | 8/2016 | Origane et al. | |
| 2017/0241982 | A1* | 8/2017 | Dewilde | G01N 33/5014 |
| 2021/0344348 | A1* | 11/2021 | Bhaumik | H03L 7/1075 |

FOREIGN PATENT DOCUMENTS

| | | |
|---|---|---|
| JP | 2016154399 | 8/2016 |
| JP | 2019179662 | 10/2019 |

\* cited by examiner

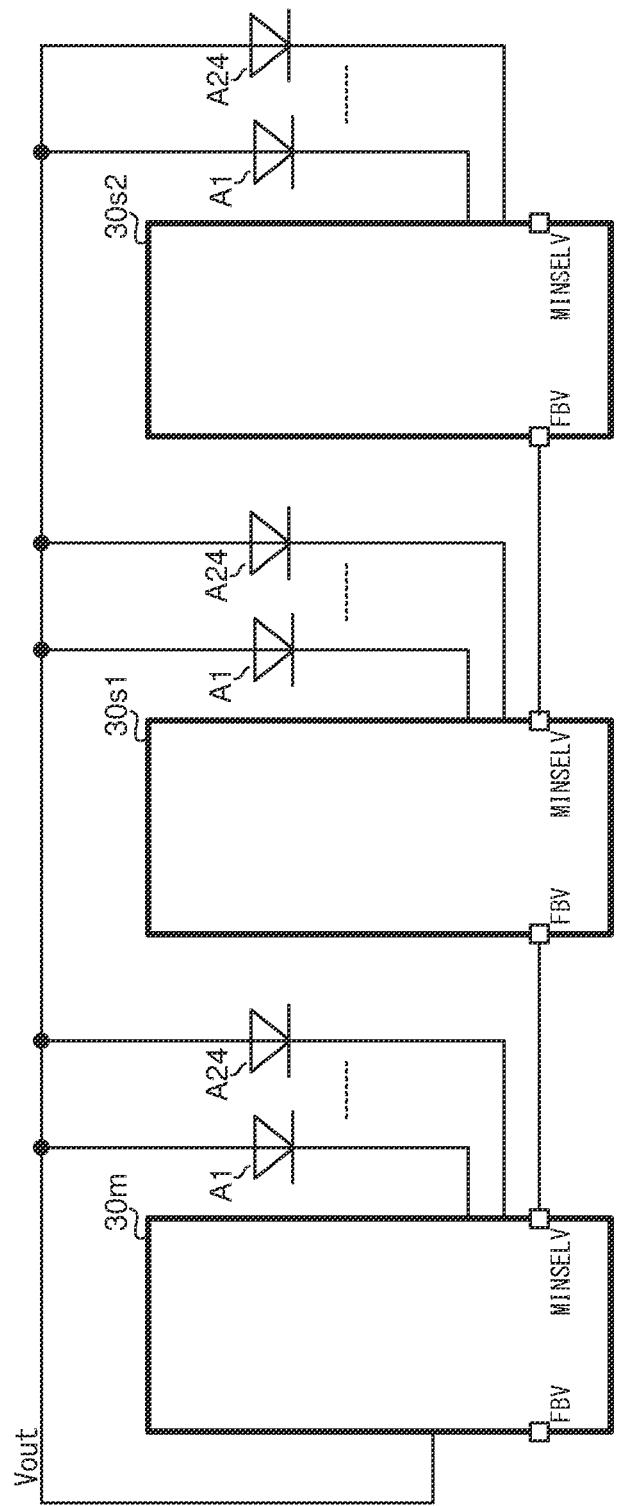

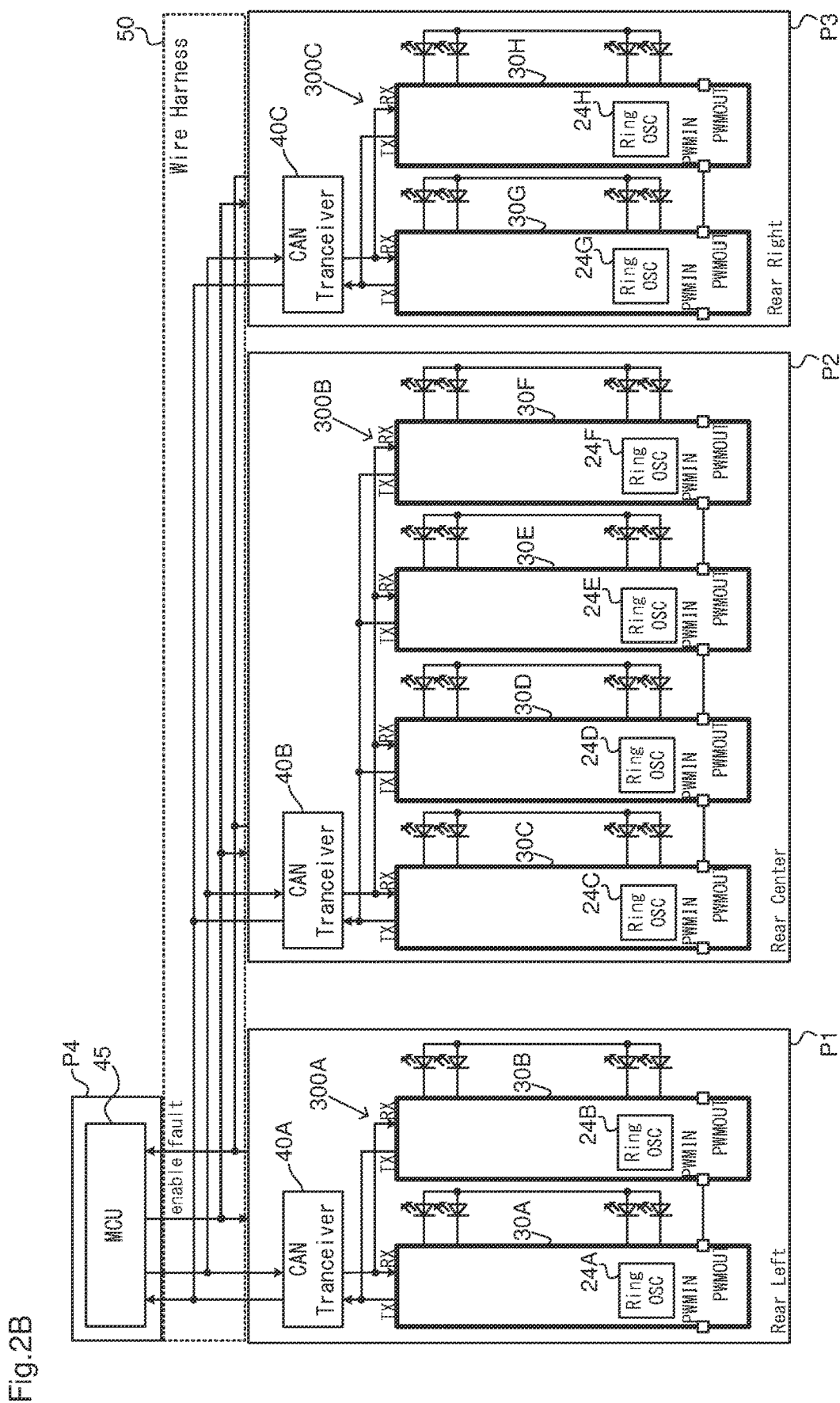

Fig.4

| SYNCSET[1:0] | PWMIN | PWMOUT |
|---|---|---|
| 00 | disable | disable |
| 01 | disable | 18MHz/(36,864) |
| 10 | enable | disable |
| 11 | enable | PWMIN |

SEMICONDUCTOR DEVICE AND SEMICONDUCTOR DEVICE SYSTEM

TECHNICAL FIELD

The present disclosure relates to semiconductor devices that include an oscillator.

BACKGROUND ART

Conventionally, semiconductor devices that incorporate a semiconductor integrated circuit (IC) are often provided with an oscillator for generating a clock signal. For example, they can generate a PWM (pulse width modulation) signal based on a clock signal.

In a case where a semiconductor device as mentioned above is an LED (light-emitting diode) driving device (LED driver), the LED driving device can be one that performs PWM dimming of an LED by use of the above-mentioned PWM signal. An example of an LED driving device provided with a PWM dimming function is seen in Patent Document 1 identified below.

CITATION LIST

Patent Literature

Patent Document 1: JP-A-2019-179662

SUMMARY

Technical Problem

Here, for example in an application that involves the lighting of a large number of LEDs, a plurality of semiconductor devices each like the one mentioned above are sometimes used to build a system. In that case, there may be variation among the frequencies of the clock signals generated by the oscillators included in those semiconductor devices respectively. Variation among clock signal frequencies can result in, for example, loss of synchronization among the PWM signals. This may lead to a defect in the image formed by PWM dimming of LEDs.

Providing the semiconductor devices each with a crystal oscillator may help suppress variation among clock signal frequencies; this, however, is disadvantageous in terms of cost.

Under the background discussed above, an object of the present disclosure is to provide a semiconductor device that, when more than one of it are used, allows synchronization among the frequencies of the clock signals generated in individual semiconductor devices.

Solution to Problem

According to one aspect of the present disclosure, a semiconductor device includes:
an oscillator configured to generate a first clock signal;
a first terminal via which an input clock signal is fed in from the outside;
a first counter configured to count a clock signal based on the first clock signal between edges in the input clock signal; and
a controller configured to send to the oscillator an instruction to adjust the frequency of the first clock signal based on the result of comparison of the count value by the first counter with an expected value. (A first configuration.)

In the first configuration described above, there may be further provided: a frequency divider configured to divide the first clock signal by a predetermined frequency division factor to generate a second clock signal; a selector configured to select and output either the input clock signal or the second clock signal as an output clock; and a second terminal via which the output clock is fed out to the outside. (A second configuration.)

In the second configuration described above, the frequency divider may includes: a first frequency divider configured to divide the first clock signal by a first frequency division factor; and a second frequency divider configured to divide the output of the first frequency divider by a second frequency division factor. The first counter may be configured to count the output of the first frequency divider. (A third configuration.)

In the second or third configuration described above, the frequency divider may be configured to generate the second clock signal with a duty factor limited to a predetermined value. (A fourth configuration.)

In any of the second to fourth configurations described above, the selector may be configured to be able to be set to select the input clock signal, to select the second clock signal, or not to output the output clock. (A fifth configuration.)

In any of the first to fifth configurations described above, the oscillator may be a ring oscillator. (A sixth configuration.)

In the sixth configuration described above, the ring oscillator may include: an odd number of inverters; a DAC (DA converter) configured to perform DA conversion on a coarse adjustment instruction from the controller; a current feeder configured to pass through the inverters a current corresponding to the output of the DAC; and a mirror capacitance adjuster configured to change the capacitance value of a capacitance connected to a node among the inverters based on a fine adjustment instruction from the controller. (A seventh configuration.)

In the seventh configuration described above, the mirror capacitance adjuster may include a plurality of capacitance units each including a capacitor and a switch arranged between the capacitor and the node. The semiconductor device may further include a first self diagnosis circuit configured to, while changing the pattern of the capacitance units in which the switch is turned on, apply a low-level and a high-level voltage to the node and compare the outputs of the capacitance units with an expected value. (An eighth configuration.)

In the seventh or eighth configuration described above, there may be further provided a second self diagnosis circuit including: a measurement circuit configured to measure the frequency of the first clock signal in test operation in which, of the coarse adjustment instruction and the fine adjustment instruction, one is held constant and the other is changed; and a comparator configured to compare the result of measurement by the measurement circuit before and after a change in the instruction. (A ninth configuration.)

In the ninth configuration described above, the second self diagnosis circuit may include a second counter of a predetermined bits configured to count a signal of a predetermined frequency. The measurement circuit may be a third counter configured to count the first clock signal during a period in which the second counter counts the predetermined bits. (A tenth configuration.)

In any of the first to tenth configurations described above, there may be further provided a PWM signal generator configured to generate a PWM signal based on the first clock signal. (An eleventh configuration.)

In the eleventh configuration described above, the PWM signal generator may be configured to produce an edge in the PWM signal when an edge is detected in the input clock signal. (A twelfth configuration.)

In the eleventh or twelfth configuration described above, there may be further provided: an LED terminal connectable to the cathode of an LED; and a current driver configured to control a current passed to the LED terminal. The current driver may be configured to be turned on and off in accordance with the PWM signal. (A thirteenth configuration.)

According to another aspect of the present disclosure, a semiconductor device system includes a plurality of semiconductor devices according to the thirteenth configuration described above. The plurality of semiconductor devices are each instructed on the on-duty factor of the PWM signal from the outside via a CAN (controller area network) transceiver. (A fourteenth configuration.)

According to yet another aspect of the present disclosure, a semiconductor device system includes a plurality of semiconductor devices according to the second to fifth configurations described above. The second terminal of the semiconductor device in a preceding stage is connected to the first terminal of the semiconductor device in a succeeding stage. (A fifteenth configuration.)

The semiconductor device system according to the fifteenth configuration described above may be for vehicle onboard use.

Advantageous Effects

With a semiconductor device according to the present disclosure, even when more than one of it are used, it is possible to obtain synchronization in frequency among the clock signals generated in the individual semiconductor devices.

BRIEF DESCRIPTION OF DRAWINGS

FIG. 2A is a diagram showing one example of use of a plurality of LED driving devices connected together.

FIG. 2B is a diagram showing an example of a system configuration where LED driving devices are applied to a rear lamp of a vehicle.

FIG. 4 is a table showing correspondence among set data SYNCSET in a register, whether a PWMIN terminal is enabled/disabled, and whether a PWMOUT terminal is enabled/disabled.

DESCRIPTION OF EMBODIMENTS

Hereinafter an illustrative embodiment of the present disclosure will be described with reference to the accompanying drawings. Any specific values mentioned in the following description are merely examples.

<1. Configuration of an LED Driving Device>

Figure 1:
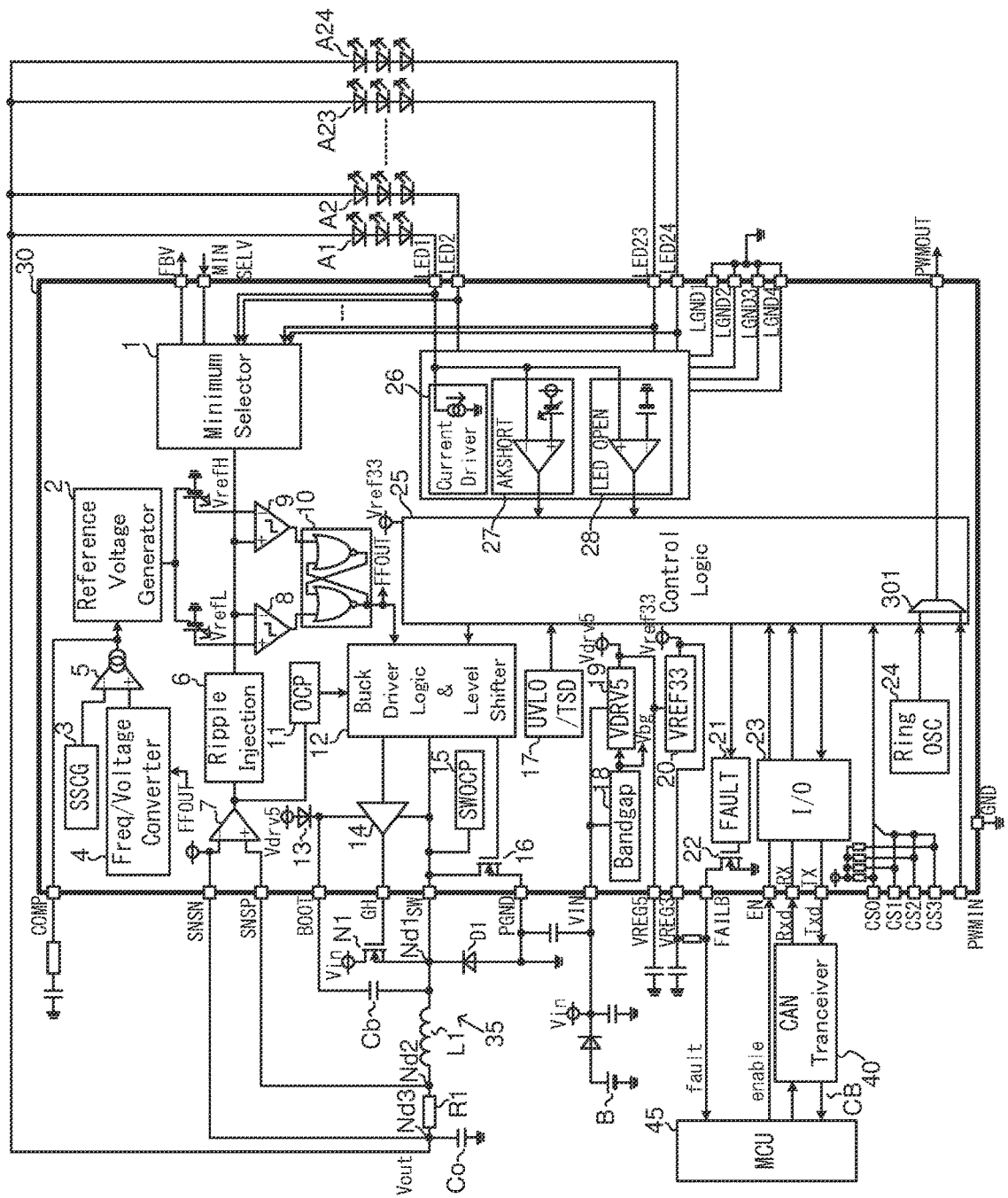
FIG. 1 is a diagram showing the configuration of an LED driving device according to an illustrative embodiment of the present disclosure.

FIG. 1 is a diagram showing the configuration of an LED driving device 30 according to an illustrative embodiment of the present disclosure. The LED driving device 30 shown in FIG. 1 drives LED arrays A1 to A24 in a plurality of channels (in the embodiment, as one example, 24 channels). The LED driving device 30 is, as one example, for vehicle onboard use.

The LED driving device 30 is a semiconductor device that incorporates a semiconductor integrated circuit (IC chip), which has integrated in it a minimum voltage selector 1, a reference voltage generator 2, a spread spectrum reference voltage generator 3, a frequency-voltage converter 4, an error amplifier 5, a ripple injector 6, an amplifier 7, a low-side comparator 8, a high-side comparator 9, an RS flip-flop 10, an OCP (overcurrent protection) circuit 11, a driver logic circuit 12, a diode 13, a driver 14, a SWOCP circuit 15, an NMOS transistor 16, an UVLO (undervoltage lock-out)/TSD (thermal shut-down) circuit 17, a band gap reference circuit 18, an internal voltage generator 19, an internal voltage generator 20, a fault notifier 21, an NMOS transistor 22, an I/O (input/output) port 23, a ring oscillator 24, a control logic circuit 25, a current driver 26, a short detector 27, and an open detector 28.

The LED driving device 30 also has, as external terminals for establishing electrical connection with the outside, a COMP terminal, an SNSN terminal, an SNSP terminal, a BOOT terminal, a GH terminal, an SW terminal, a PGND terminal, a VIN terminal, a VREG5 terminal, a VREG3 terminal, a FAILB terminal, an EN terminal, an RX terminal, a TX terminal, CS0 to CS3 terminals, a PWMIN terminal, an FBV terminal, a MINSELV terminal, LED1 to LED24 terminals, LGND1 to LGND4 terminals, a PWMOUT terminal, and a GND terminal.

Outside the LED driving device 30, an output stage 35 is arranged that generates from an input voltage Vin an output voltage Vout by DC-DC conversion and feeds the output voltage Vout to the anodes of the LED arrays A1 to A24. The output stage 35 includes, all as discrete components, a switching element N1, a diode D1, an inductor L1, a resistor R1, and an output capacitor Co. The switching element N1 is driven and controlled by the LED driving device 30, and thereby the output stage 35 is controlled by the LED driving device 30. The output stage 35 and the LED driving device 30 together constitute a DC-DC converter. In this embodiment, the DC-DC converter so constituted is, more specifically, an asynchronous-rectification buck (step-down) DC-DC converter.

Specifically, the drain of the switching element N1, which is configured as an NMOS transistor, is connected to an application terminal for the input voltage Vin. A node Nd1 at which the source of the switching element N1 and the cathode of the diode D1 are connected together is connected to the SW terminal. The anode of the diode D1 is connected to an application terminal for a ground potential. The node Nd1 is connected to one terminal of the inductor L1. The other terminal of the inductor L1 is connected to one terminal of the resistor R1 at a node Nd2. The other terminal of the resistor R1 is connected to one terminal of the output capacitor Co at a node Nd3. The other terminal of the output capacitor Co is connected to the application terminal for the ground potential.

The gate of the switching element N1 is connected via the GH terminal to the output terminal of the driver 14. The low-potential side of the driver 14 is connected to the SW terminal. The high-potential side of the driver 14 is connected to the cathode of the diode 13. The anode of the diode 13 is connected to an application terminal for a reference voltage Vdrv5. One terminal of a boot capacitor Cb is connected to between the inductor L1 and the node Nd1. The other terminal of the boot capacitor Cb is connected via the BOOT terminal to the cathode of the diode 13.

When the switching element N1 is on, a current passes via the switching element N1 to the inductor L1 and the resistor R1. When, under the control of the driver logic circuit 12, the output of the driver 14 is made equal to the voltage (low) at the SW terminal, the switching element N1 is turned off. Now, a current passes via the diode D1 to the inductor L1 and the resistor R1. Meanwhile, the boot capacitor Cb is charged with the reference voltage Vdrv5 via the diode 13.

When, under the control of the driver logic circuit 12, the output of the driver 14 is made equal to the voltage at the BOOT terminal, the switching element N1 turns on. Now, at the BOOT terminal appears a voltage higher than the input voltage Vin by the voltage appearing across the boot capacitor Cb resulting from its being charged. This makes it possible to turn on the switching element N1, which is an NMOS transistor.

Through on/off control of the switching element N1 as described above, the output voltage Vout appears at the node Nd3.

The respective cathodes of the LED arrays A1 to A24 are connected to the LED1 to LED24 terminals respectively. The minimum voltage selector 1 selects, out of the voltages at the LED1 to LED24 terminals (i.e., the cathode voltages), the lowest voltage.

The node Nd2, to which one terminal of the resistor R1 is connected, is connected to the SNSP terminal. The node Nd3, to which the other terminal of the resistor R1 is connected to, is connected to the SNSN terminal. The voltages at the SNSP and SNSN terminals are fed to the amplifier 7. The amplifier 7 amplifies the voltage difference between the voltages at the SNSP and SNSN terminals and outputs the result. In this way the amplifier 7 senses the inductor current through the inductor L1 (resistor R1).

Based on the output of the amplifier 7, the ripple injector 6 injects ripples into the lowest voltage selected by the minimum voltage selector 1. The ripple-injected lowest voltage is fed to the inverting input terminal (−) of the low-side comparator 8 and also to the non-inverting input terminal (+) of the high-side comparator 9. The output of the low-side comparator 8 is fed to the reset terminal of the RS flip-flop 10. The output of the high-side comparator 9 is fed to the set terminal of the RS flip-flop 10. From the Q output terminal of the RS flip-flop 10, a flip-flop output signal FFOUT is output. Based on the flip-flop output signal FFOUT, the driver logic circuit 12 controls the switching element N1 via the driver 14.

The frequency-voltage converter 4 converts the frequency of the flip-flop output signal FFOUT into a voltage signal and feeds it to the non-inverting input terminal (+) of the error amplifier 5. On the other hand, the inverting input terminal (−) of the error amplifier 5 is fed with the output of the spread spectrum reference voltage generator 3. Based on the output of the error amplifier 5, the reference voltage generator 2 generates a low-side reference voltage VrefL and a high-side reference voltage VrefH, each variably. The low-side reference voltage VrefL is fed to the non-inverting input terminal (+) of the low-side comparator 8. The high-side reference voltage VrefH is fed to the inverting input terminal (−) of the high-side comparator 9.

The configuration described above achieves hysteresis control (bang-bang control) such that, among the cathode voltages of the LED arrays A1 to A24, the lowest voltage is controlled to be equal to a desired voltage. Moreover, the spread spectrum reference voltage generator 3, by varying the switching frequency with time, spreads frequencies across a spectrum and suppress the peak of power across the spectrum, as a measure against EMI (electromagnetic interference).

The FBV and MINSELV terminals are used when a plurality of LED driving devices 30 are used connected together. As one example, FIG. 2A shows a configuration where three LED driving devices 30 (30m, 30s1, 30s2) are used connected together. In FIG. 2A, the LED driving device 30m corresponds to a master (described later), and the LED driving devices 30s1 and 30s2 correspond to slaves (described later).

To each of the LED driving devices 30m, 30s1, and 30s2, the respective cathodes of LED arrays A1 to A24 are connected. The respective anodes of the LED arrays A1 to A24 are fed with the output voltage Vout generated by the DC/DC function of the LED driving device 30m. The DC/DC function of the LED driving devices 30s1 and 30s2 is not used. In FIG. 2A, for convenience' sake, the configuration related to the output of the output voltage Vout is shown in a simplified form.

Via the FBV terminal, the lowest voltage selected by the minimum voltage selector 1 out of the respective cathode voltages of the LED arrays A1 to A24 and the voltage at the MINSELV terminal is fed out. To the MINSELV terminal, the FBV terminal of an external LED driving device 30 is connected.

In the example in FIG. 2A, the MINSELV terminal of the LED driving device 30m is connected to the FBV terminal of the LED driving device 30s1, and the MINSELV terminal of the LED driving device 30s1 is connected to the FBV terminal of the LED driving device 30s2. The FBV terminal of the LED driving device 30m and the MINSELV terminal of the LED driving device 30s2 are left unconnected. It is preferable that the MINSELV terminal of the LED driving device 30s2 be connected to an application terminal for a high-gain voltage, such as the reference voltage Vdrv5 appearing at the VREG5 terminal of the LED driving device 30s2, so as not to affect the selection of the lowest voltage.

Thus, in the LED driving device 30s2, out of the respective cathode voltages of the LED arrays A1 to A24, the lowest voltage is selected, and the selected lowest voltage is fed out via the FBV terminal of the LED driving device 30s2. In the LED driving device 30s1, out of the voltage fed in via its MINSELV terminal from the FBV terminal of the LED driving device 30s2 and the respective cathode voltages of the LED arrays A1 to A24, the lowest voltage is selected, and the selected lowest voltage is fed out via the FBV terminal of the LED driving device 30s1. In the LED driving device 30m, out of the voltage fed in via its MINSELV terminal from the FBV terminal of the LED driving device 30s1 and the respective cathode voltages of the LED arrays A1 to A24, the lowest voltage is selected, and the selected lowest voltage is used in the DC-DC function.

Thus, the output voltage Vout is controlled such that, out of the respective cathode voltages of all the LED arrays (in the example in FIG. 2A, in 24 channels×3=72 channels) connected to the plurality of LED driving devices 30 connected together, the lowest voltage is equal to the desired value.

Referring back to FIG. 1, based on the result of the sensing of the inductor current by the amplifier 7, the OCP circuit 11 detects an overcurrent and applies protection.

The SWOCP circuit 15 is a circuit that detects an overcurrent through the switching element N1.

The NMOS transistor 16 is connected between the SW terminal and the PGND terminal. The PGND terminal is connected to the ground potential. When the driver logic circuit 12 turns on the NMOS transistor 16, the output capacitor Co is discharged.

The UVLO/TSD circuit 17 monitors the input voltage Vin to apply undervoltage protection, and also monitors the junction temperature in the LED driving device 30 to apply overheat protection.

The input voltage Vin is generated based on a battery voltage B and is applied to the VIN terminal. The band gap reference circuit 18 is a reference voltage source that generates a stable reference voltage Vbg based on the input voltage Vin applied to the VIN terminal. The internal voltage generator 19 generates a reference voltage Vdrv5 of five volts based on the input voltage Vin. The output terminal of the internal voltage generator 19 is connected via the VREG5 terminal to a capacitor. The internal voltage generator 20 generates a reference voltage Vref33 of 3.3 volts based on the reference voltage Vdrv5. The output terminal of the internal voltage generator 20 is connected via the VREG3 terminal to a capacitor.

An MCU (microcontroller unit) 45 and a CAN (controller area network) transceiver 40 are arranged outside the LED driving device 30.

The NMOS transistor 22 is pulled up via a resistor to the reference voltage Vref33 appearing at the VREG3 terminal. In accordance with an instruction from the control logic circuit 25, the fault notifier 21 turns on the NMOS transistor 22 and thereby sends a low-level fault signal "fault" to the MCU 45.

The MCU 45 transmits an enable signal "enable" to the control logic circuit 25 via the EN terminal and the I/O port 23.

The CAN transceiver 40 receives data from the MCU 45 via a CAN bus CB and transmits the data, as reception data Rxd, to the RX terminal. The control logic circuit 25 receives the reception data Rxd via the I/O port 23. The control logic circuit 25 transmits transmission data Txd to the TX terminal via the I/O port 23. The CAN transceiver 40 transmits the transmission data Txd received from the TX terminal to the MCU 45 via the CAN bus CB. The I/O port 23 is configured as an UART (universal asynchronous receiver/transmitter), and converts between serial and parallel signals.

The CS0 to CS3 terminals are each pulled up via a resistor to a supply voltage. In accordance with the combination of high and low set at the CS0 to CS3 terminals, a unique number (ID) for identification of the LED driving device 30 is set in the control logic circuit 25.

The ring oscillator 24 is an oscillator that generates a clock signal. Based on the clock signal, a PWM signal is generated to perform PWM dimming.

The PWMIN terminal, the PWMOUT terminal, and a selector 301 are used in a case where, as will be described later, a plurality of LED driving devices 30 are connected together and the frequencies of the clock signals generated by the ring oscillators 24 in the individual LED driving devices 30 are to be synchronized. This will be described in detail later (it should be noted that, in FIG. 1, the interconnection between the ring oscillator 24 and the selector 301 is shown in a simplified form.

The current driver 26 is provided one for each of the LED1 to LED24 terminals, and feeds a constant current to each of the LED arrays A1 to A24. Through on/off control of the current driver 26 based on the PWM signal, PWM dimming of the LED arrays A1 to A24 is achieved. DC dimming is also possible by, while keeping the current driver 26 on, varying the set value of the constant current.

The short detector 27 is provided one for each of the LED1 to LED24 terminals, and detects based on the voltage at the corresponding terminal a short fault in the LED arrays A1 to A24 to apply short protection.

The open detector 28 is provided one for each of the LED1 to LED24 terminals, and detects based on the voltage at the corresponding terminal an open fault in the LED arrays A1 to A24 to apply open protection.

<2. Connecting a Plurality of LED Driving Devices Together>

In this embodiment, to cope with applications that involve the lighting of a large number of LEDs, a plurality of LED driving devices 30 (semiconductor devices) can be connected together. FIG. 2B shows, as one example of such an application, an example of a system configuration where the LED driving device 30 is applied to a rear lamp of a vehicle. In FIG. 2B, for convenience' sake, the individual LED driving devices 30 are identified by the reference signs 30A to 30H respectively. The CAN transceivers 40A to 40C in FIG. 2B correspond to the CAN transceiver 40 in FIG. 1.

As shown in FIG. 2B, the LED driving devices 30A and 30B and the CAN transceiver 40A are used for a rear lamp at the rear left of the vehicle. The LED driving devices 30A and 30B and the CAN transceiver 40A are mounted on a printed circuit board P1. The LED driving devices 30A and 30B connected together constitute a semiconductor device system 300A.

For the rear lamp at the rear left of the vehicle, the LED driving devices 30A and 30B drive LED arrays in 24 channels×2=48 channels. The PWMOUT terminal of the LED driving device 30A in a preceding stage is connected to the PWMIN terminal of the LED driving device 30B in a succeeding stage. Thus, with the LED driving device 30A as a master and the LED driving device 30B as a slave, the frequency of the clock signal generated by the ring oscillator 24B in the LED driving device 30B can be synchronized with the frequency of the clock signal generated by the ring oscillator 24A in the LED driving device 30A. How frequency synchronization is achieved will be described later.

As shown in FIG. 2B, the LED driving devices 30C to 30F and the CAN transceiver 40B are used in a rear lamp in the rear middle of the vehicle. The LED driving devices 30C to 30F and the CAN transceiver 40B are mounted on a printed circuit board P2. The LED driving devices 30C to 30F connected together constitute a semiconductor device system 300B.

In the rear lamp in the rear middle of the vehicle, the LED driving devices 30C to 30F drive LED arrays in 24 channels×4=96 channels. The PWMOUT terminal of the LED driving device 30C in a preceding stage is connected to the PWMIN terminal of the LED driving device 30D in a succeeding stage. The PWMOUT terminal of the LED driving device 30D in a preceding stage is connected to the PWMIN terminal of the LED driving device 30E in a succeeding stage. The PWMOUT terminal of the LED driving device 30E in a preceding stage is connected to the PWMIN terminal of the LED driving device 30F in a succeeding stage. Thus, with the LED driving device 30C as a master and the LED driving devices 30D to 30F as slaves, the frequencies of the clock signals generated by the ring oscillators 24D to 24F in the LED driving devices 30D to 30F can be synchronized with the frequency of the clock signal generated by the ring oscillator 24C in the LED driving device 30C.

As shown in FIG. 2B, the driving devices 30G and 30H and the CAN transceiver 40C are used for a rear lamp at the rear right of the vehicle. The LED driving devices 30G and 30H and the CAN transceiver 40C are mounted on a printed circuit board P3. The LED driving devices 30G and 30H connected together constitute a semiconductor device system 300C.

For the rear lamp at the rear right of the vehicle, the LED driving devices 30G and 30H drive LED arrays in 24 channels×2=48 channels. The PWMOUT terminal of the LED driving device 30G in a preceding stage is connected to the PWMIN terminal of the LED driving device 30H in a succeeding stage. Thus, with the LED driving device 30G as a master and the LED driving device 30H as a slave, the frequency of the clock signal generated by the ring oscillator 24H in the LED driving device 30H can be synchronized with the frequency of the clock signal generated by the ring oscillator 24G in the LED driving device 30G.

The LED driving devices 30A and 30B and the CAN transceiver 40A can transmit and receive data to and from one another. The LED driving devices 30C to 30F and the CAN transceiver 40B can transmit and receive data to and from one another. The LED driving devices 30G and 30H and the CAN transceiver 40C can transmit and receive data to and from one another.

The CAN transceivers 40A to 40C can transmit and receive data to and from the MCU 45 mounted on a printed circuit board P4 across a wire harness 50. The CAN bus CB (FIG. 1) is included in the wire harness 50. Via the CAN transceivers 40A to 40C the MCU 45 can instruct the LED driving devices 30A to 30H on the on-duty factor of PWM dimming.

The MCU 45 can transmit the enable signal "enable" to the LED driving devices 30A to 30H across the wire harness 50, and can receives the fault signal "fault" from the LED driving devices 30A to 30H across the wire harness 50.

<3. Frequency Synchronization for the Clock Signal>

Figure 3:
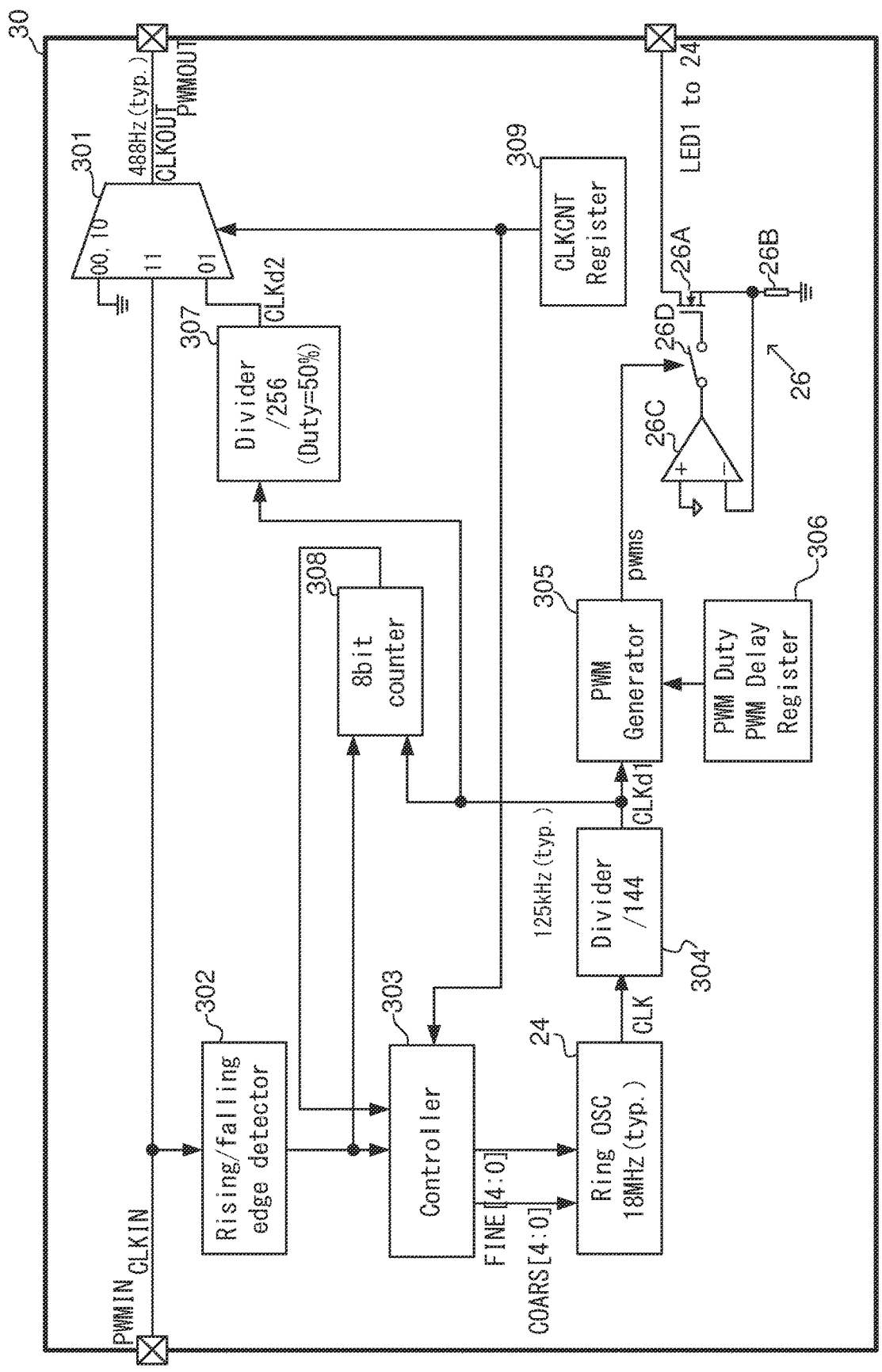
FIG. 3 is a block diagram showing a configuration related to frequency synchronization for a clock signal in an LED driving device.

Next, a description will be given of how frequency synchronization is achieved with respect to the frequency of the clock signal generated by the ring oscillator 24. FIG. 3 is a block diagram showing a configuration related to frequency synchronization for the clock signal in the LED driving device 30. FIG. 3 also shows a configuration related to PWM dimming.

As shown in FIG. 3, the LED driving device 30 includes a selector 301, a rising/falling edge detector 302, a controller 303, a frequency divider 304, a PWM signal generator 305, a register 306, a frequency divider 307, an 8-bit counter 308, and a register 309.

The rising/falling edge detector 302 detects rising and falling edges in an input clock signal CLKIN that is fed to the PWMIN terminal from the outside.

The controller 303 transmits a coarse adjustment instruction COARS and a fine adjustment instruction FINE to the ring oscillator 24, thereby to adjust the frequency of the clock signal CLK generated by the ring oscillator 24. Here, it is assumed, as one example, that the coarse adjustment instruction COARS and the fine adjustment instruction FINE are each a 5-bit digital instruction signal. A configuration for adjusting the frequency with these instructions will be described later.

It is further assumed, as one example, that the clock signal CLK generated by the ring oscillator 24 has a frequency of 18 MHz as a typical value. The frequency divider 304 divides the frequency of the clock signal CLK by a predetermined frequency division factor. Here, it is assumed, as one example that the predetermined frequency division factor is 1/144. Thus, the clock signal CLKd1 after frequency division that is output from the frequency divider 304 has a frequency of 18 MHz/144=125 kHz as a typical value.

Based on the clock signal CLKd1, the PWM signal generator 305 generates a PWM signal "pwms". For example, the PWM signal generator 305 includes a counter that counts the clock signal CLKd1. In an LED driving device 30 operating as a slave, when the rising/falling edge detector 302 detects a rising edge in the input clock signal CLKIN, the PWM signal generator 305 raises the PWM signal "pwms" to high and simultaneously resets the above-mentioned counter. Thereafter, when the above-mentioned counter has counted a count value calculated by multiplying the integer that is the denominator of the frequency division factor of the frequency divider 307 (described later) with the numerator assumed to be one by the on-duty factor of PWM dimming set in the register 306, the PWM signal generator 305 drops the PWM signal "pwms" to low. As will be described later, the frequency division factor of the frequency divider 307 is, as one example, 1/256, and thus, if the on-duty factor is assumed to be, for example, 50%, the above-mentioned count value is 256×50%=128.

Instead of the foregoing, for example, the PWM signal generator 305 may raise the PWM signal "pwms" to high and simultaneously reset the counter when, for example, the counter has counted the integer that is the denominator of the frequency division factor of the frequency divider 307 with the numerator assumed to be one.

By contrast, in an LED driving device 30 operating as a master, the PWM signal generator 305 generates the PWM signal "pwms" as follows: at the same time that the clock signal CLKd2 from the frequency divider 307 rises to high, the PWM signal generator 305 resets the counter and raises the PWM signal "pwms" to high; when the counter has counted a count value corresponding to the on-duty factor, the PWM signal generator 305 drops the PWM signal "pwms" to low.

Incidentally, with an instruction from the MCU 45 via the CAN transceiver 40, the on-duty factor of PWM diming is set in the register 306.

As shown in FIG. 3, the current driver 26 includes an NMOS transistor 26A, a resistor 26B, an error amplifier 26C, and a switch 26D. The drain of the NMOS transistor 26A is connected to one of the LED1 to LED24 terminals. The source of the NMOS transistor 26A is connected to one terminal of the resistor 26B. The other terminal of the resistor 26B is connected to the application terminal for the ground potential. The node to which the source of the NMOS transistor 26A and the resistor 26B are connected is connected to the inverting input terminal (−) of the error amplifier 26C. The non-inverting input terminal (+) of the error amplifier 26C is fed with a predetermined reference voltage. The Switch 26D is arranged between the output terminal of the error amplifier 26C and the gate of the NMOS transistor 26A.

Within one period of the PWM signal "pwms", turning the switch 26D on in the on-duty period turns the current driver 26 on, and turning the switch 26D off in the off-duty period turns the current driver 26 off. In this way, in accordance with the PWM signal "pwms", PWM dimming is achieved.

In the register 306, also the delays of the PWM signal "pwms" among LED channels can be set. This helps restrain currents from starting to pass through the LED arrays of all the channels simultaneously.

The frequency divider 307 divides the frequency of the clock signal CLKd1 by a predetermined frequency division factor. Here, the predetermined frequency division factor is assumed to be, as one example, 1/256. Thus, the clock signal CLKd2 after frequency division that is output from the frequency divider 307 has a frequency of 125 kHz/256=488 Hz as a typical value. It should be noted that the frequency divider 307 generates the clock signal CLKd2 with a predetermined duty factor. Here, the predetermined duty factor is assumed to be, as one example, 50%.

In accordance with the settings in the register 309, the selector 301 selects and outputs either the input clock signal CLKIN from the PWMIN terminal or the clock signal CLKd2 from the frequency divider 307 as an output clock signal CLKOUT via the PWMOUT terminal to the outside, or chooses not to output the output clock signal CLKOUT.

FIG. 4 shows the correspondence among 2-bit setting data SYNCSET that is set in the register 309, whether the PWMIN terminal is enabled/disabled, and whether the PWMOUT terminal is enabled/disabled.

As shown in FIG. 4, with SYNCSET="01", the selector 301 selects the clock signal CLKd2 (with a typical value of 18 KHz/(144×256)=488 Hz) and outputs it as the output clock signal CLKOUT; with SYNCSET="11", the selector 301 selects the clock signal CLKIN and outputs it as the output clock signal CLKOUT. With SYNCSET="00" or "10", the selector 301 does not output the output clock signal CLKOUT, and thus the PWMOUT terminal is disabled.

Here, as shown in FIG. 4, with SYNCSET="10" or "11", the controller 303 adjusts the frequency of the clock signal CLK based on the input clock signal CLKIN. That is, the PWMIN terminal is enabled.

Specifically, when the rising/falling edge detector 302 detects a rising edge in the input clock signal CLKIN, the controller 303 resets the 8-bit counter 308. The 8-bit counter 308 counts the clock signal CLKd1. When the rising/falling edge detector 302 detects a falling edge in the input clock signal CLKIN, the controller 303 compares the count value of the 8-bit counter 308 with a predetermined first expected value. Here, the first expected value is, for example, a value calculated by multiplying the integer that is the denominator of the frequency division factor of the frequency divider 307 with the numerator assumed to be one by the on-duty factor of the clock signal CLKd2. That is, the first expected value is, as one example, 256×50%=128.

If the count value is greater than the first expected value, the controller 303 instructs the ring oscillator 24 to lower the frequency of the clock signal CLK; if the count value is smaller than the first expected value, the controller 303 instructs the ring oscillator 24 to raise the frequency of the clock signal CLK.

When the rising/falling edge detector 302 detects a falling edge in the input clock signal CLKIN, the controller 303 resets the 8-bit counter 308. Thereafter, when the rising/falling edge detector 302 detects a rising edge in the input clock signal CLKIN, the controller 303 compares the count value of the 8-bit counter 308 with a predetermined second expected value. Here, the second expected value is, for example, a value calculated by subtracting the above-mentioned first expected value from the integer that is the denominator of the frequency division factor of the frequency divider 307 with the numerator assumed to be one. That is, when the first expected value is 128, the second expected value is 256−128=128.

If the count value is greater than the second expected value, the controller 303 instructs the ring oscillator 24 to lower the frequency of the clock signal CLK; if the count value is smaller than the second expected value, the controller 303 instructs the ring oscillator 24 to raise the frequency of the clock signal CLK.

Instead, a configuration is also possible where, when a falling edge is detected in the input clock signal CLKIN, counting is continued without the counter being reset and thereafter, when a rising edge is detected in the input clock signal CLKIN, the count value is compared with the second expected value. In that case, the second expected value in the example described above is 256.

The frequency divider 304 may be omitted, in which case a counter (corresponding to the 8-bit counter 308) can count the clock signal CLK itself.

As shown in FIG. 4, with SYNCSET="00" or "01", the frequency adjustment for the clock signal CLK based on the input clock signal CLKIN by the controller 303 is not performed, and the PWMIN terminal is disabled.

Figure 5:
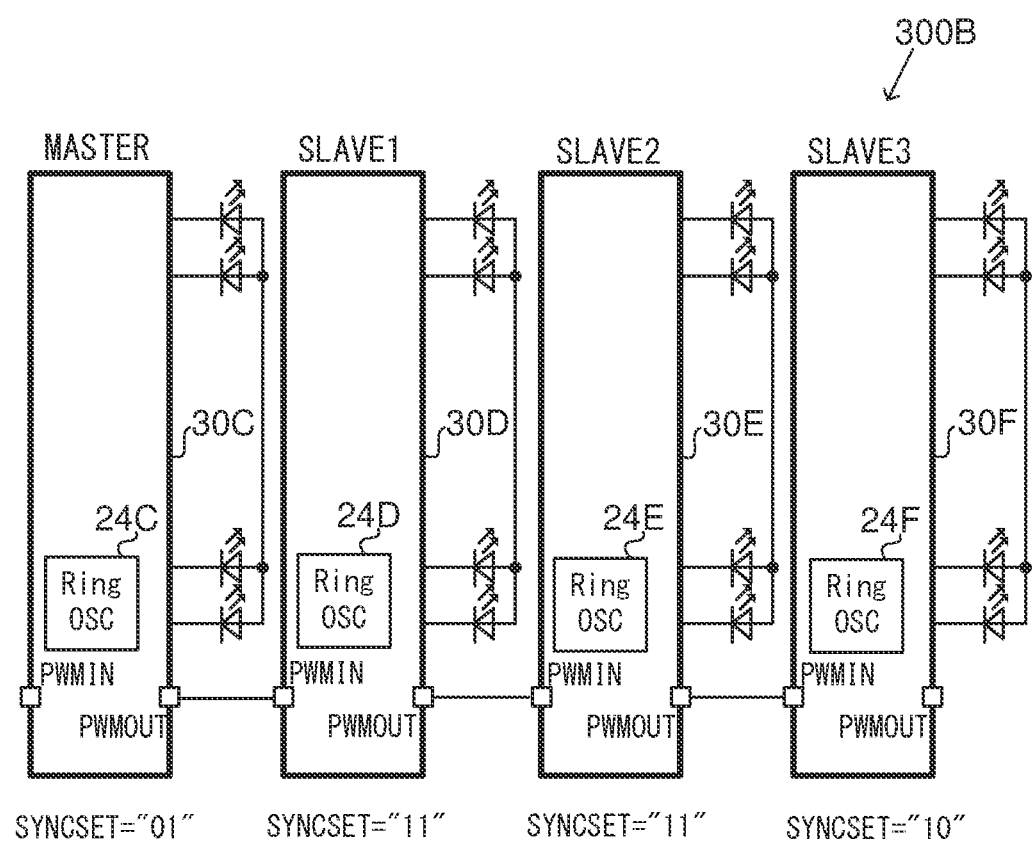
FIG. 5 is a diagram showing one example of a configuration where a plurality of LED driving devices are connected together.

FIG. 5 shows, as one example, SYNCSET that is set in the register 309 in each LED driving device 30 in a case where, as in FIG. 2B referred to previously, LED driving devices 30C to 30F are connected together to build a semiconductor device system 300B.

In the LED driving device 30C operating as a master, SYNCSET="01". Thus, the PWMIN terminal is disabled. The ring oscillator 24 generates a clock signal CLK with a frequency according to the code delivered from the controller 303. The frequency of the generated clock signal CLK is divided by the frequency dividers 304 and 307, and the clock signal CLKd2 after frequency division is selected by the selector 301 to be fed out as the output clock signal CLKOUT via the PWMOUT terminal to the outside.

In the LED driving device 30D operating as a slave, SYNCSET="11". Thus, the PWMIN terminal is enabled, and the above-described frequency adjustment for the clock signal CLK based on the input clock signal CLKIN by the controller 303 is performed. Here, the input clock signal CLKIN is the output clock signal CLKOUT that is output from the PWMOUT terminal of the LED driving device 30C in the preceding stage. Thus, the frequency of the clock signal CLK generated by the ring oscillator 24 in the LED driving device 30D operating as a slave is adjusted to be equal to the frequency of the clock signal CLK generated by the ring oscillator 24 in the LED driving device 30C operating as a master.

In the LED driving device 30D, the selector 301 selects the input clock signal CLKIN, which is fed out as the output clock signal CLKOUT via the PWMOUT terminal to the outside.

In the LED driving device 30E operating as a slave, SYNCSET="11". Thus, the PWMIN terminal is enabled, and the above-described frequency adjustment for the clock signal CLK based on the input clock signal CLKIN by the controller 303 is performed. Here, the input clock signal CLKIN is the output clock signal CLKOUT that is output from the PWMOUT terminal of the LED driving device 30D in the preceding stage. Thus, the frequency of the clock signal CLK generated by the ring oscillator 24 in the LED driving device 30E operating as a slave is adjusted to be equal to the frequency of the clock signal CLK generated by the ring oscillator 24 in the LED driving device 30C operating as a master.

In the LED driving device 30E, the selector 301 selects the input clock signal CLKIN, which is fed out as the output clock signal CLKOUT via the PWMOUT terminal to the outside.

In the LED driving device 30F operating as a slave, since it is in the last stage among the plurality of LED driving devices 30 connected together, SYNCSET="10". Thus, the PWMIN terminal is enabled, and the above-described frequency adjustment for the clock signal CLK based on the input clock signal CLKIN by the controller 303 is performed. Here, the input clock signal CLKIN is the output clock signal CLKOUT that is output from the PWMOUT terminal of the LED driving device 30E in the preceding stage. Thus, the frequency of the clock signal CLK generated by the ring oscillator 24 in the LED driving device 30F operating as a slave is adjusted to be equal to the frequency of the clock signal CLK generated by the ring oscillator 24 in the LED driving device 30C operating as a master.

In the LED driving device 30F, the output clock signal CLKOUT is not output, and the PWMOUT terminal is disabled.

As described above, frequency synchronization for the clock signal CLK is achieved in a configuration where a plurality of LED driving device 30 are connected together. Frequency synchronization for the clock signal can be achieved by simply outputting the clock signal generated by the ring oscillator in an LED driving device operating as a master as it is to slaves. With this configuration, however, a high-frequency clock signal is output, and this poses a problem from the perspective of EMI suppression. By contrast, according to the embodiment, the clock signal CLKd2 that results from dividing the frequency of the clock signal CLK generated by the ring oscillator is fed to slaves, and this keeps way the above-mentioned problem.

Figure 6:
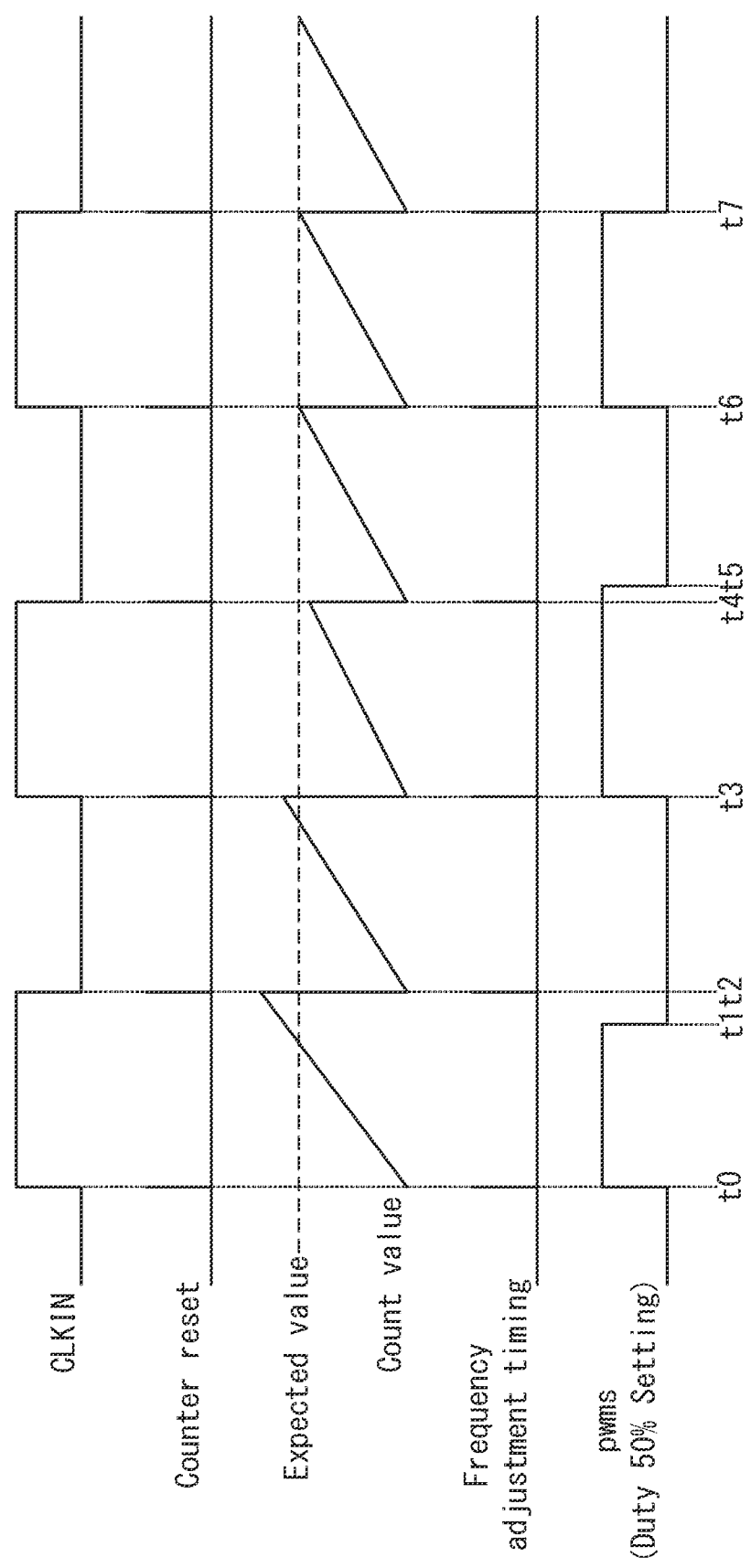
FIG. 6 is a timing chart showing one example of frequency adjustment for a clock signal CLK based on an input clock signal CLKIN.

FIG. 6 is a timing chart showing one example of frequency adjustment for the clock signal CLK based on the input clock signal CLKIN by the controller 303. FIG. 6 depicts, from top down, the input clock signal CLKIN, the reset signal for the 8-bit counter 308 (i.e., the output of the rising/falling edge detector 302), the count value in the 8-bit counter 308, the frequency adjustment timing, and the PWM signal "pwms" with its duty factor set at 50%.

As shown in FIG. 6, when at timing t0 a rising edge in the input clock signal CLKIN is detected, the 8-bit counter 308 is reset, and the PWM signal "pwms" is raised. Thereafter, at timing t2, when a fall of the input clock signal CLKIN is detected, the count value is greater than the first expected value. This is because, as will be seen from the PWM signal "pwms" falling at timing t1, the frequency of the clock signal CLK is higher than the frequency of the clock signal CLK in the master.

Accordingly, in the frequency adjustment at timing t2, the frequency of the clock signal CLK is adjusted to become lower. As a result, after the counter is reset at timing 2, at timing t3 (the timing that a rising edge in the input clock signal CLKIN is detected), the count value is higher than the second expected value (here, equal to the first expected value) but is so by a smaller amount. At timing t3, the frequency of the clock signal CLK is adjusted to be still lower, the count value is reset, and the PWM signal "pwms" is raised.

Thereafter, at timing t4, when a fall of the input clock signal CLKIN is detected, the count value is smaller than the first expected value. This is because, as will seen from the PWM signal "pwms" falling at timing t5, the frequency of the clock signal CLK is lower than the frequency of the clock signal CLK in the master.

Accordingly, in the frequency adjustment at timing t4, the frequency of the clock signal CLK is adjusted to become higher. As a result, after the count value is reset at timing t4, at timing t6 (the timing that a rising edge in the input clock signal CLKIN is detected), the count value is approximately equal to the second expected value. Thus, at timing t6, no frequency adjustment for the clock signal CLK is performed, the counter is reset, and the PWM signal "pwms" is raised. Thereafter, at timing t7, when a falling edge in the input clock signal CLKIN is detected, the count value is approximately equal to the first expected value, and the frequency of the clock signal CLK is equal to (is synchronous with) the frequency of the clock signal CLK in the master. Thus, as shown in FIG. 6, at timing t7, the PWM signal "pwms" falls.

As shown in FIG. 6 as one example, the frequency of the input clock signal CLKIN has small variation (e.g., 488 Hz±10%) and in addition the frequency divider 307 limits the duty factor of the input clock signal CLKIN to a predetermined value (here, as one example, 50%); thus frequency adjustment is possible through feedback control at both rising and falling edges in the input clock signal CLKIN. This helps reduce the time required for the frequency to stabilize.

Moreover, as shown in FIG. 6, at the timing of every rising edge in the input clock signal CLKIN, the PWM signal "pwms" is raised; thus, through synchronization of the frequency of the clock signal CLK, synchronization is achieved easily also for the phase of the PWM signal "pwms".

<4. Coarse Adjustment and Fine Adjustment of the Frequency>

Figure 7:
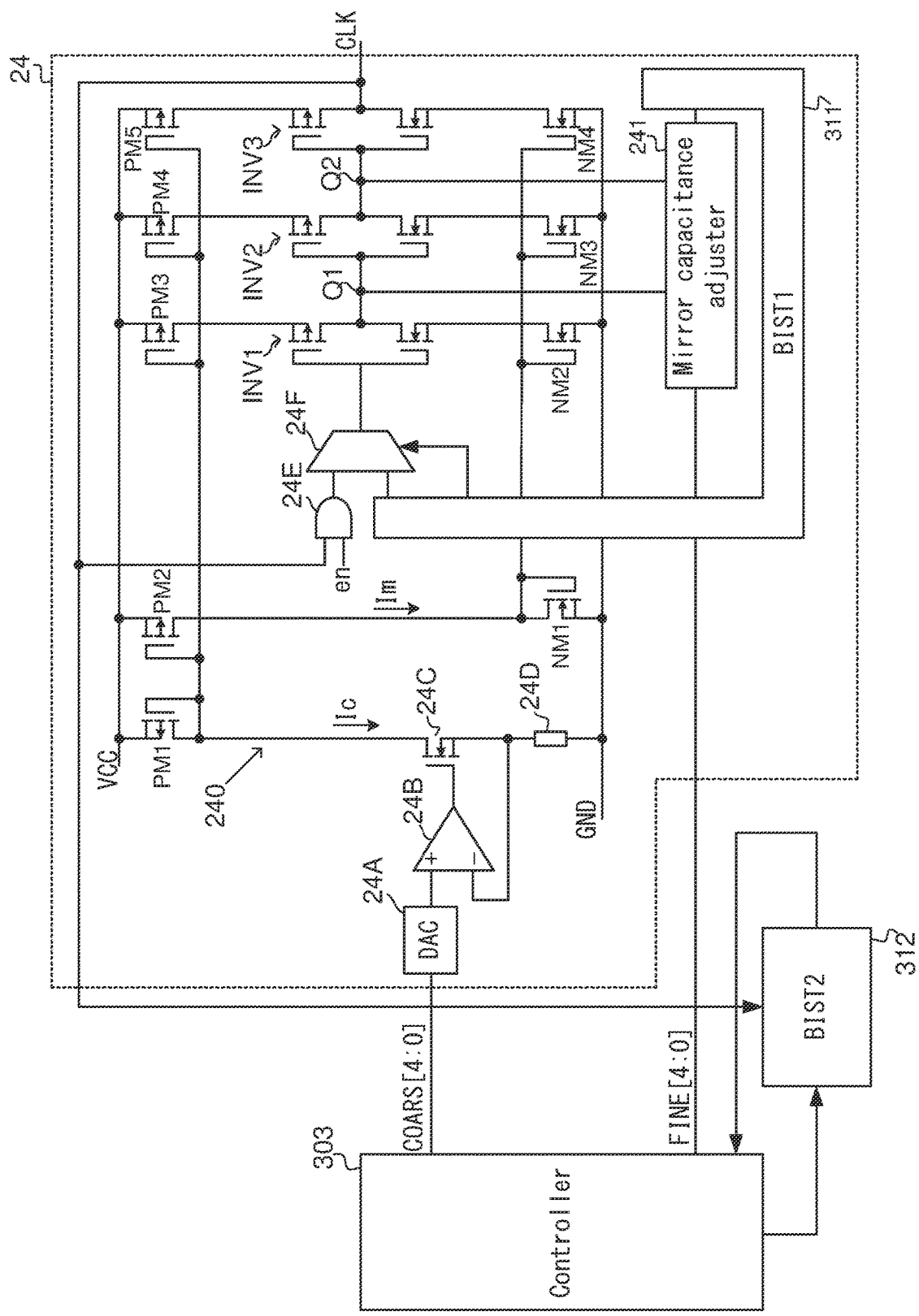
FIG. 7 is a diagram showing an example of the configuration of a ring oscillator.

Now, a configuration for the adjustment of the frequency of the clock signal CLK generated by the ring oscillator 24 will be described more specifically. FIG. 7 is a diagram showing an example of the configuration of the ring oscillator 24.

As shown in FIG. 7, the ring oscillator 24 includes a DAC (DA converter) 24A, an error amplifier 24B, an NMOS transistor 24C, a resistor 24D, an AND circuit 24E, a selector 24F, PMOS transistors PM1 to PM5, NMOS transistors NM1 to NM4, inverters INV1 to INV3, and a mirror capacitance adjuster 241. As shown in FIG. 7, the LED driving device 30 includes a first self-diagnosis circuit 311 and a second self-diagnosis circuit 312.

The DAC 24A performs DA conversion on a coarse adjustment instruction COARS fed from the controller 303 to convert it into an analog voltage signal. As mentioned earlier, the coarse adjustment instruction COARS is here, as one example, a 5-bit digital signal. The analog voltage signal is fed to the non-inverting input terminal (+) of the error amplifier 24B.

The error amplifier 24B, the NMOS transistor 24C, and the resistor 24D together constitute a constant current circuit that generates a constant current Ic. Specifically, source of the NMOS transistor 24C is connected to one terminal of the resistor 24D, and the other terminal of the resistor 24D is connected to the application terminal for the ground potential. The node to which the source of the NMOS transistor 24C and one terminal of the resistor 24D are connected is connected to the inverting input terminal (−) of the error amplifier 24B. The output terminal of the error amplifier 24B is connected to the gate of the NMOS transistor 24C. Thus, the constant current Ic passing through the NMOS transistor 24C is generated with a current value corresponding to the analog voltage signal output from the DAC 24A.

The inverter INV2 is arranged in the stage succeeding the inverter INV1, and the inverter INV3 is arranged in the stage succeeding the inverter INV2. The inverters INV1 to INV3 each include a high-side PMOS transistor and a low-side NMOS transistor. The ring oscillator may be composed of, not limited to three inverters like INV1 to INV3, but any odd number of inverters.

The output terminal of the inverter INV3 is connected to one input terminal of the AND circuit 24E. The other input terminal of the AND circuit 24E is fed with the enable signal "en". In normal operation, the selector 24F selects the output of the AND circuit 24E to feed it to the input terminal of the inverter INV1. That is, when the enable signal "en" is high, in normal operation the output of the inverter INV3 is fed to the input terminal of the inverter INV1. The inverter INV3 then outputs the clock signal CLK.

By the operation of a current mirror constituted by the PMOS transistors PM1 and PM3, a current that mirrors the constant current Ic passes into the PMOS transistor in the inverter INV1. By the operation of a current mirror constituted by the PMOS transistors PM1 and PM4, a current that mirrors the constant current Ic passes into the PMOS transistor in the inverter INV2. By the operation of a current mirror constituted by the PMOS transistors PM1 and PM5, a current that mirrors the constant current Ic passes into the PMOS transistor in the inverter INV3.

Likewise, by the operation of a current mirror constituted by the PMOS transistors PM1 and PM2, a current Im that mirrors the constant current Ic passes into the NMOS transistor NM1. By the operation of a current mirror constituted by the NMOS transistors NM1 and NM2, a current that mirrors the current Im passes out of the NMOS transistor in the inverter INV1. By the operation of a current mirror constituted by the NMOS transistors NM1 and NM3, a current that mirrors the current Im passes out of the NMOS transistor in the inverter INV2. By the operation of a current mirror constituted by the NMOS transistors NM1 and NM4, a current that mirrors the current Im passes out of the NMOS transistor in the inverter INV3.

Thus, the constant current circuit, the PMOS transistors PM1 to PM5, and the NMOS transistors NM1 to NM4 constitute a current feeder 240 that feeds the inverters INV1 to INV3 with currents in accordance with the output of the DAC 24A.

With this configuration, it is possible to adjust, in accordance with the coarse adjustment instruction COARS, the current passing through the inverters INV1 to INV3, hence the response delay in the inverters INV1 to INV3, and hence the frequency of the clock signal CLK output from the ring oscillator 24 (inverter INV3). Specifically, the higher the current passing through the inverters INV1 to INV3, the smaller the response delay, and thus the higher the frequency of the clock signal CLK.

As shown in FIG. 7, the mirror capacitance adjuster 241 is connected to a node Q1 to which the output terminal of the inverter INV1 and the input terminal of the inverter INV2 are connected, and also to a node Q2 to which the output terminal of the inverter INV2 and the input terminal of the inverter INV3 are connected. The first self-diagnosis circuit 311 converts the fine adjustment instruction FINE fed from the controller 303 into an instruction for the mirror capacitance adjuster 241, and transmits this instruction to the mirror capacitance adjuster 241. As mentioned earlier, the fine adjustment instruction FINE is, as one example, a 5-bit digital signal.

In accordance with the instruction from the first self-diagnosis circuit 311, the mirror capacitance adjuster 241 varies the capacitance value of the capacitance connected to the nodes Q1 and Q2, and thereby adjusts the response delay in the inverters INV2 and INV3 and hence the frequency of the clock signal CLK. Specifically, the higher the capacitance value of the capacitance connected to the nodes Q1 and Q2, the greater the response delay, and thus the lower the frequency of the clock signal CLK. The mirror capacitance adjuster 241 and the first self-diagnosis circuit 311 will be described in detail later.

Here, adjustment with the coarse adjustment instruction COARS and the DAC 24A alone allows frequency adjustment over a wide range but leaves fine adjustment difficult. On the other hand, adjustment with the fine adjustment instruction FINE and the mirror capacitance adjuster 241 alone allows fine adjustment but requires a large circuit area to permit the frequency to be varied over a wide range. Accordingly, in the embodiment, adjustment is performed by use of both the coarse adjustment instruction COARS and the fine adjustment instruction FINE to allow fine adjustment over a wide range while suppressing an increase in the circuit area.

Figure 8:
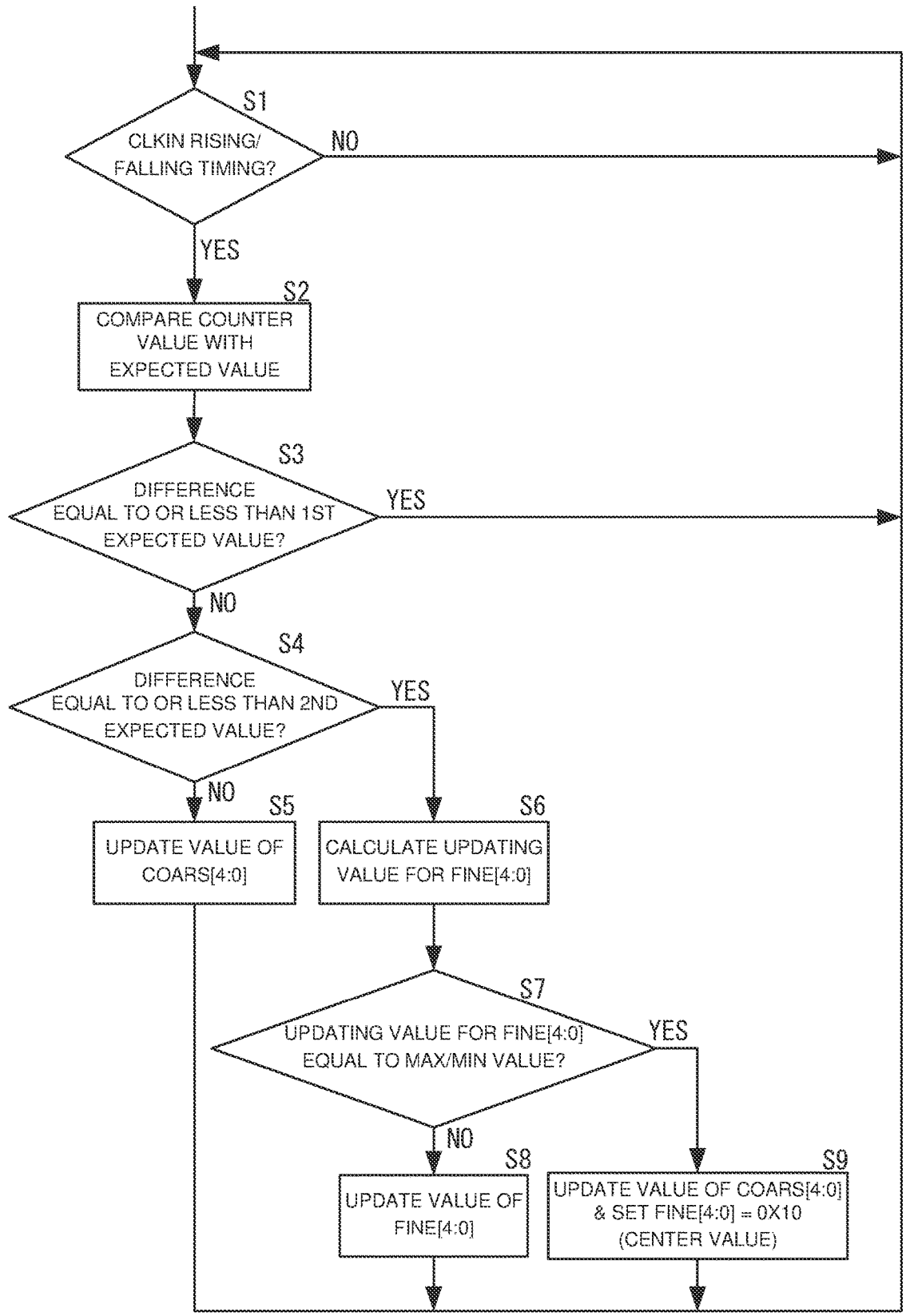
FIG. 8 is a flow chart related to frequency adjustment for a clock signal CLK.

FIG. 8 is a flow chart related to frequency adjustment for the clock signal CLK in the configuration shown in FIG. 7 and described above. As shown in FIG. 8, when at step S1 the rising/falling edge detector 302 detects a rising or falling edge in the input clock signal CLKIN (step S1, "YES"), an advance is made to step S2.

At step S2, the controller 303 compares the count value of the 8-bit counter 308 with an expected value. If the difference between the count value and the expected value is equal to or less than the first expected value (step S3, "YES"), a return is made to the check at step S1. If at step S3 the difference between the count value and the expected value is not equal to or less than the first expected value (step S3, "NO"), an advance is made to step S4.

If at step S4 the difference between the count value and the expected value is not equal to or less than a second predetermined value (>the first predetermined value) (step S4, "NO"), an advance is made to step S5. At step S5, the controller 303 updates the value of the coarse adjustment instruction COARS. By contrast, if the difference between the count value and the expected value is equal to or less than a second predetermined value (step S4, "YES"), an advance is made to step S6. At step S6, the controller 303 calculates an updating value for the fine adjustment instruction FINE. Then at step S7, it is checked whether the updating value for the fine adjustment instruction FINE equals the maximum or minimum value.

If the updating value equals neither the maximum nor minimum value (step S7, "NO"), an advance is made to step S8, where the controller 303 updates the value of the fine adjustment instruction FINE to the updating value. By contrast, if the updated value equals the maximum or minimum value (step S7, "YES"), an advance is made to step S9, where the controller 303 updates the value of the coarse adjustment instruction COARS and sets the value of the fine adjustment instruction FINE to the center value.

<5. Testing>

The LED driving device 30 (semiconductor device) according to the embodiment is subjected to a wafer test and a final test in inspection before product shipment.

The wafer test is a test that is performed before circuits formed on an wafer are separated into IC chips. In the wafer test, through code setting with the coarse adjustment instruction COARS and the fine adjustment instruction FINE, the frequency of the clock signal CLK is measured with the frequency set at the center value, the frequency of the clock signal CLK is measured with the frequency set at the maximum value, and the frequency of the clock signal CLK is measured with the frequency set at the minimum value. Frequency measurement is performed, for example, with probes put in contact with electrode pads.

In the wafer test, the first self-diagnosis circuit 311 (described later) performs a stack fault test on the mirror capacitance adjuster 241. The stack fault test does not take much time, and can thus be suitably included in the wafer test.

The final test is a test that is performed after IC chips have been packaged into the form of products, and in it, as in the wafer test, the frequency of the clock signal CLK is measured with the frequency set at the center value, the maximum value, and the minimum value.

In the final test, the second self-diagnosis circuit 312 (described later; FIG. 7) performs a code-interval frequency linearity test. This linearity test by the second self-diagnosis circuit 312 may be included in the wafer test.

Incidentally the first and self-diagnosis circuit 311 and 312 are circuits that employ BISTs (built-in self-tests). The BIST is one technology directed to DFT (design for testability). In a BIST, the functions of an IC tester is built into an IC chip. Specifically, "a circuit for generating a test pattern" and "a circuit for checking check results with expected values" are integrated in an IC.

<6. Testing by the First Self-Diagnosis Circuit>

Figure 9:
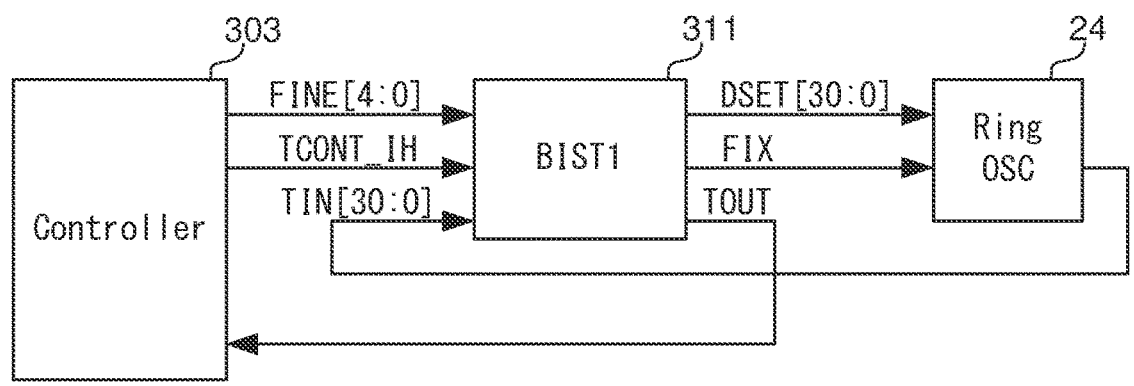
FIG. 9 is a block diagram showing a configuration related to a test by a first self-diagnosis circuit.

FIG. 9 is a block diagram showing the configuration related to testing by the first self-diagnosis circuit 311.

Figure 11:
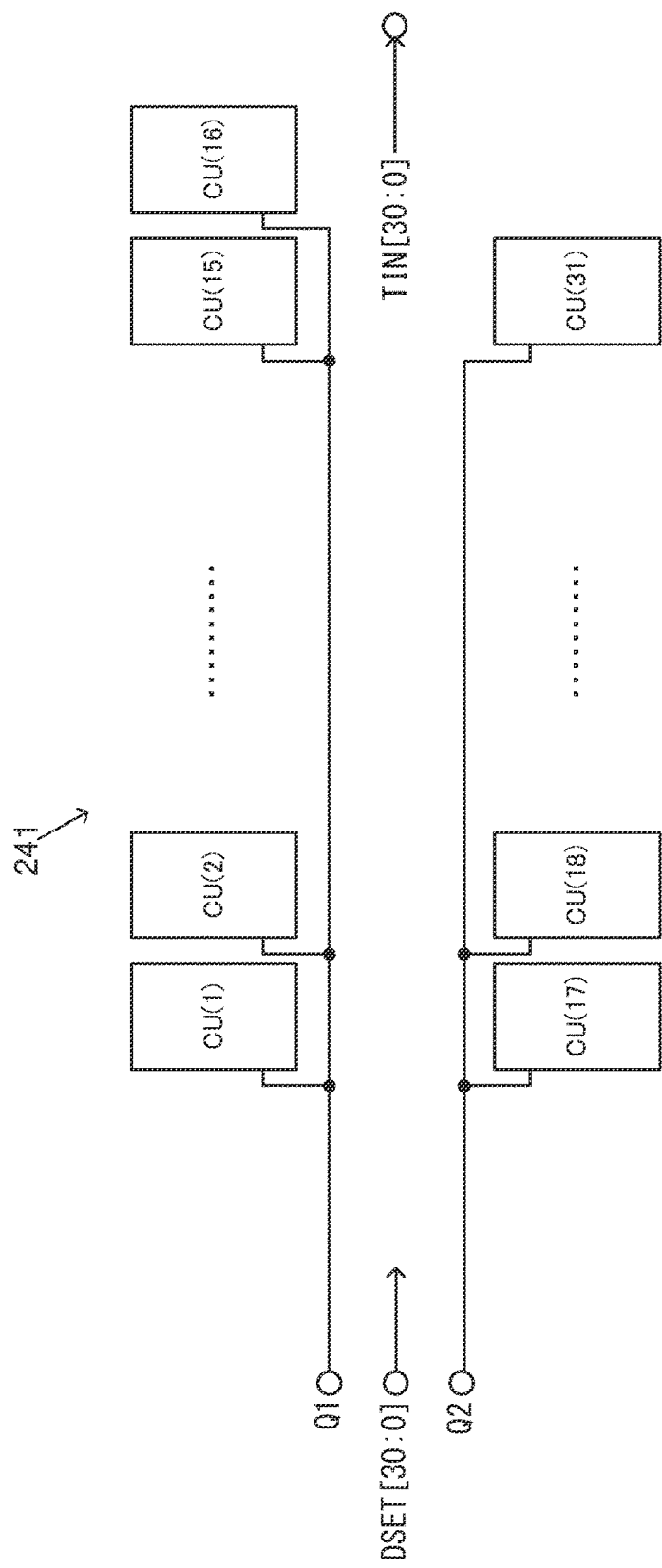
FIG. 11 is a diagram showing an example of the internal configuration of a mirror capacitance adjuster.

FIG. 11 is a diagram showing an example of the internal configuration of the mirror capacitance adjuster 241. As shown in FIG. 11, the mirror capacitance adjuster 241 includes 16 capacitance units CU(1) to CU(16) and 15 capacitance units CU(17) to CU(31). The capacitance units CU(1) to CU(16) are connected to the node Q1 (FIG. 7). The capacitance units CU(17) to CU(31) are connected to the node Q2 (FIG. 7).

Figure 12:
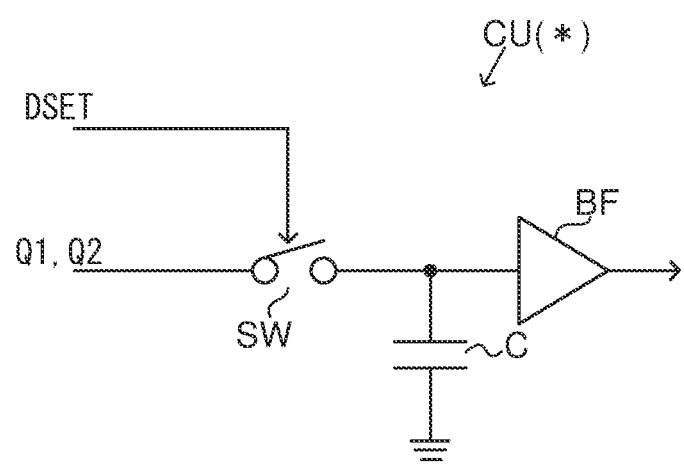
FIG. 12 is a diagram showing an example of the internal configuration of each capacitance unit.

FIG. 12 is a diagram showing an example of the internal configuration of each capacitance unit CU(*). The capacitance unit CU(*) includes a switch SW, a buffer BF, and a capacitor C. The switch SW switches between a conducting and a cut-off state the path between the node Q1 or Q2 and one terminal of the capacitor C.

As shown in FIG. 9, the first self-diagnosis circuit 311 converts the fine adjustment instruction FINE (5-bit) from the controller 303 into a setting signal DEST (31-bit). In the ring oscillator 24, in accordance with the setting signal DEST, the switch in each capacitance unit CU(*) is set to on or off. Specifically, for example, the value "1" or "0" in each of the lowest to sixteenth bits in the setting signal DEST corresponds to on or off of the switch SW in the corresponding one of the capacitance units CU(1) to CU(16) connected to the node Q1, and the value "1" or "0" in each of the seventeenth to highest bits in the setting signal DEST corresponds to on or off of the switch SW in the corresponding one of the capacitance units CU(17) to CU(31) connected to the node Q2.

Control proceeds, for example, as follows. If the fine adjustment instruction FINE is "0" (in decimal form), the setting signal DEST prescribes that the switches SW in all the capacitance units CU(*) be off; if the fine adjustment instruction FINE is "1" (in decimal form), the setting signal DEST prescribes that only the switch SW in the capacitance unit CU(1) be on and that the switches SW in the other capacitance units CU(*) be off; if the fine adjustment instruction FINE is "2" (in decimal form), the setting signal DEST prescribes that only the switches SW in the capacitance units CU(1) and CU(2) be on and that the switches SW in the other capacitance units CU(*) be off; and so forth such that, as the value (in decimal form) of the fine adjustment instruction FINE increases by one, the number of capacitance units CU(*) in which the switch SW is on increases by one.

That is, in the above control, as the value of the fine adjustment instruction FINE increases, the number of capacitors C connected to the nodes Q1 and Q2 increases. This permits adjustment of the mirror capacitance.

Figure 10:
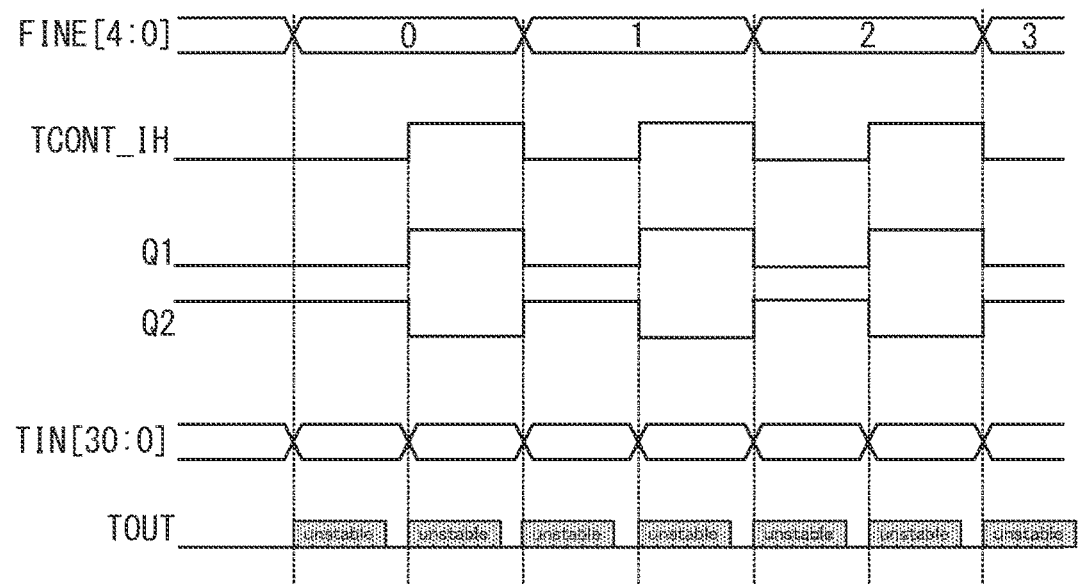
FIG. 10 is a timing chart showing one example of test operation by a first self-diagnosis circuit.

FIG. 10 is a timing chart showing one example of the test operation by the first self-diagnosis circuit 311. In FIG. 10, at the start of the test, the fine adjustment instruction FINE is "0" and a hold instruction TCONT_IH output from the controller 303 is low. Here, at the start of the test, the first self-diagnosis circuit 311 converts the hold instruction TCONT_IH into a hold signal FIX, and instructs the selector 24F to select, out of the output of the AND circuit 24E and the hold signal FIX, the hold signal FIX (FIG. 7).

Here, as one example, when the hold instruction TCONT_IH is low, the hold signal FIX is high; accordingly the node Q1 is low and the node Q2 is high. When the hold instruction TCONT_IH is high, the hold signal FIX is low; accordingly the node Q1 is high and the node Q2 is low.

Referring back to FIG. 10, since at the start of the test the hold instruction TCONT_IH is low, the node Q1 is low and the node Q2 is high. In this state, for example, the switches SW in all the capacitance units CU(*) are off. In this state, an output signal TIN formed in accordance with the levels of the signals output from the buffers BF in the individual capacitance units CU(*) is output from the ring oscillator 24 (FIG. 9). The output signal TIN is 31-bit data corresponding to the number of capacitance units CU(*). For example, if the level of the signal output from a buffer BF is high, the corresponding bit data in the output signal TIN is "1"; if the level of the signal output from a buffer BF is low, the corresponding bit data in the output signal TIN is "0".

With consideration given to the time required for the output signal TIN stabilize after the start of the test, a predetermined time after the start of the test, the first self-diagnosis circuit 311 compares the output signal TIN with the expected value. If the output signal TIN is equal to the expected value, the first self-diagnosis circuit 311 judges that there is no fault and feeds a judgment signal TOUT indicating normalcy to the controller 303; if the output signal TIN is not equal to the expected value, the first self-diagnosis circuit 311 judges that there is a fault and feeds a judgment signal TOUT indicating abnormality to the controller 303. The judgment signal TOUT is, for example, low for normalcy and high for abnormality. Once the judgment signal turns to the level indicating abnormality, it may thereafter be kept at that level.

Then, with the fine adjustment instruction FINE kept at "0", the hold instruction TCONT_IH is switched to high, so that the node Q1 is high and the node Q2 is low. The above-mentioned predetermined time after the switch, the first self-diagnosis circuit 311 compares the output signal TIN with the expected value and outputs the judgment signal TOUT.

Subsequently, the fine adjustment instruction FINE is switched to "1" and the hold instruction TCONT_IH is switched to low, so that the node Q1 is low and the node Q2 is high. Now, as described above, only the switch SW in the capacitance unit CU(1) turns on. Then, the above-mentioned predetermined time after the switch, the first self-diagnosis circuit 311 compares the output signal TIN with the expected value and outputs the judgment signal TOUT.

Then, with the fine adjustment instruction FINE kept at "1", the hold instruction TCONT_IH is switched to high, so that the node Q1 is high and the node Q2 is low. The above-mentioned predetermined time after the switch, the first self-diagnosis circuit 311 compares the output signal TIN with the expected value and outputs the judgment signal TOUT.

Thereafter, in a similar manner, while the fine adjustment instruction FINE is switched and the levels at the nodes Q1 and Q2 are switched, the output signal TIN is checked.

In this way, while the levels at the nodes Q1 and Q2 are switched, the output level of the buffer BF is checked, and this makes it possible to detect a stack fault in which a capacitance unit CU(*) remains fixed to be high, low, or open.

<7. Testing by the Second Self-Diagnosis Circuit>

Figure 13:
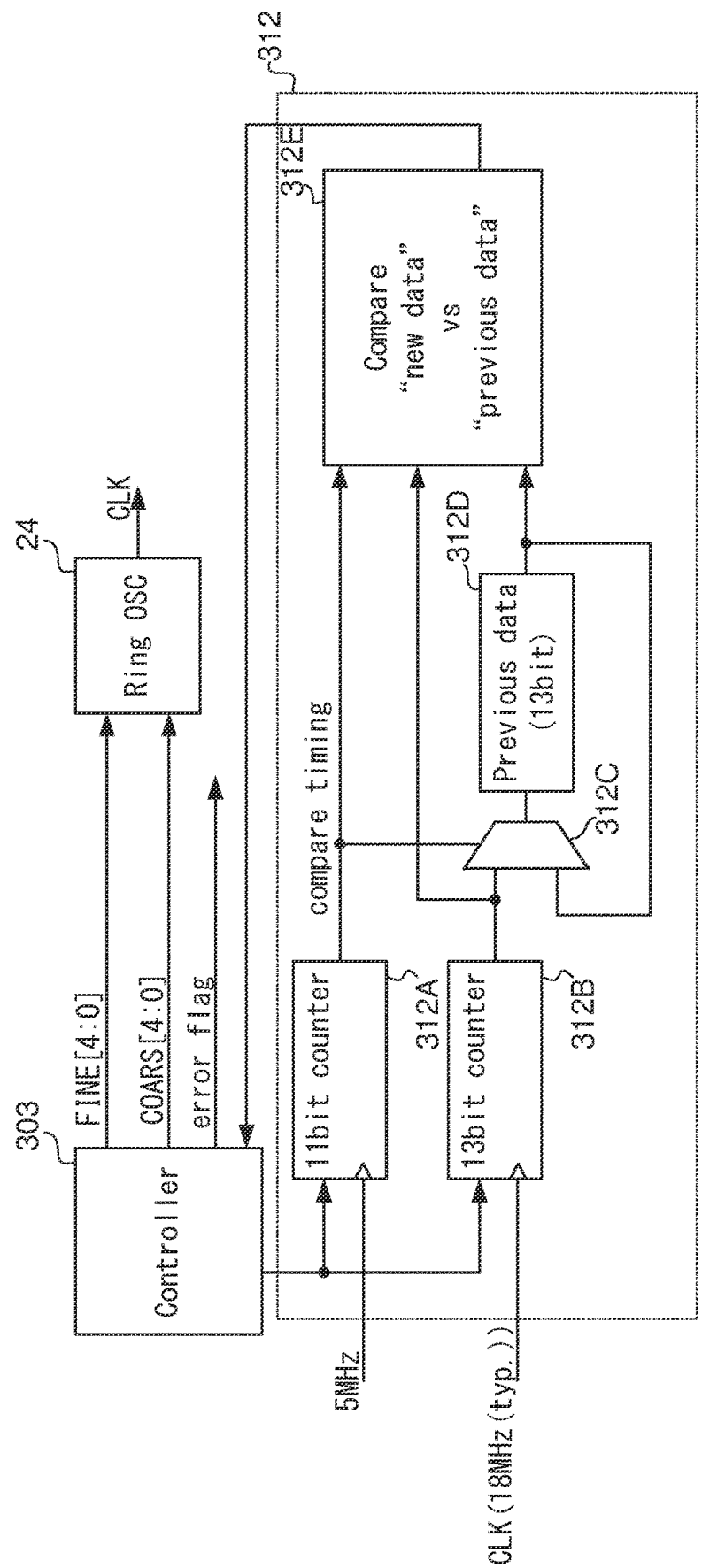
FIG. 13 is a block diagram showing an example of the configuration of a second self-diagnosis circuit.

FIG. 13 is a diagram showing an example of the configuration of the second self-diagnosis circuit 312. The second self-diagnosis circuit 312 includes an 11-bit counter 312A, a 13-bit counter 312B, a selector 312C, a previous data holder 312D, and a comparator 312E.

As will be described later, in a test using the second self-diagnosis circuit 312, either, with the value of the fine adjustment instruction FINE output from the controller 303 kept constant, the value of the coarse adjustment instruction COARS is varied or, with the value of the coarse adjustment instruction COARS kept constant, the value of the fine adjustment instruction FINE is varied, and meanwhile the frequency of the clock signal CLK is measured to check code-interval frequency linearity. In this test, the ring oscillator 24 is in the same state as in normal operation, and the selector 24F selects the output of the AND circuit 24E (FIG. 7).

Figure 14:
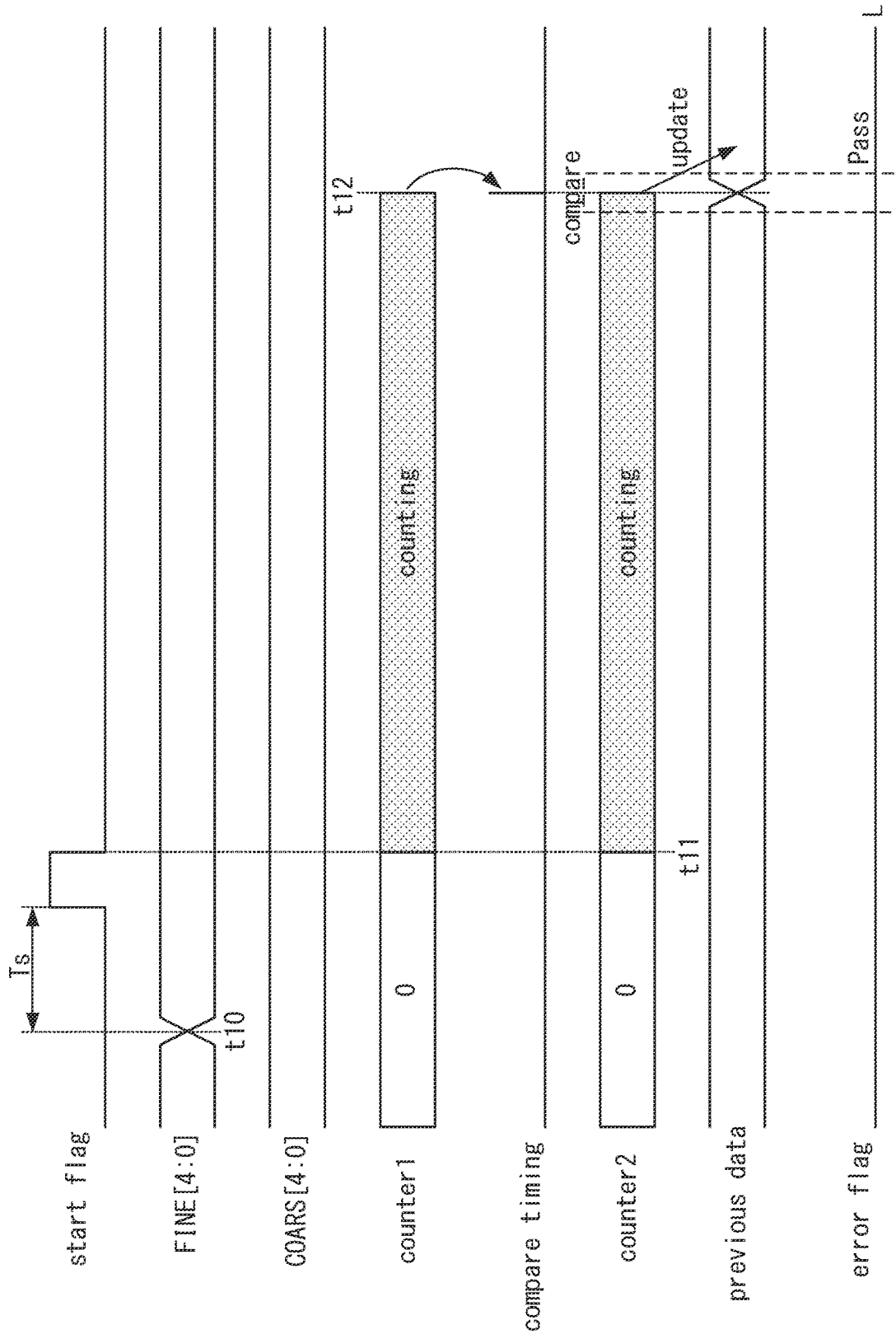
FIG. 14 is a timing chart showing one example of test operation performed with a coarse adjustment instruction COARS held constant and a fine adjustment instruction FINE varied (in a normal condition).

FIG. 14 is a timing chart showing one example of the test operation performed with the coarse adjustment instruction COARS kept constant and the fine adjustment instruction FINE varied. As shown in FIG. 14, at timing t10, the value of the fine adjustment instruction FINE is switched. After timing t10, at the lapse of the stabilization time Ts needed for stabilization of the frequency of the clock signal CLK, a start flag rises. Thereafter, when the start flag falls (timing t11), the controller 303 makes the 11-bit counter 312A and the 13-bit counter 312B start counting.

The 11-bit counter 312A counts a 5 MHz signal, and the 13-bit counter 312B counts the clock signal CLK. When the 11-bit counter 312A completes counting 11 bits (timing t12), a comparison timing signal output from the 11-bit counter 312A rises to high. In response, the comparator 312E compares the count value of the 13-bit counter 312B at that time and the count value stored in the previous data holder 312D.

The time required to count 11 bits in the 5 MHz signal is 409.6 μs, and based on the count value counted by the 13-bit counter 312B during that time, the frequency of the clock signal CLK is determined. That is, the 13-bit counter 312B corresponds to a measurement circuit that measures the frequency of the clock signal CLK. The count value with the fine adjustment instruction FINE before its value is switched at timing t10 is stored in the previous data holder 312D, and through the comparison of count values by the comparator, a code-interval change in the frequency of the clock signal CLK can be determined.

In the example in FIG. 14, the comparison by the comparator 312E finds no abnormality in the change of the frequency of the clock signal CLK; thus the comparator 312E notifies the controller 303 of normalcy, and the controller 303 outputs a low error flag indicating normalcy.

At the timing that the comparison timing signal rises to high, the selector 312C selects the count value of the 13-bit counter 312B and overwrites the previous data holder 312D with it (updates the previous data). Thereafter, the selector 312C selects the output of the previous data holder 312D, and thus the data in the previous data holder 312D does not change.

Figure 15:
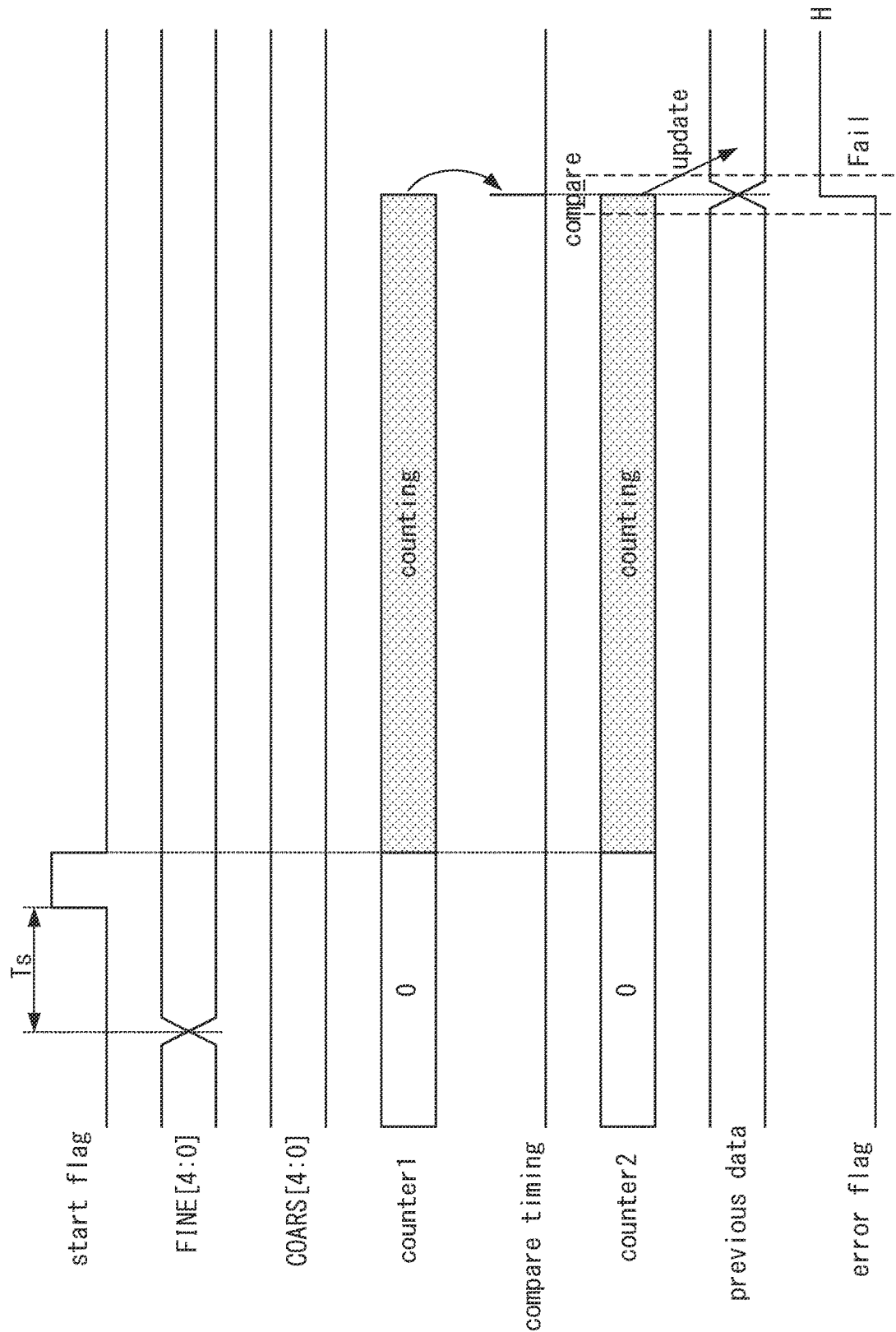
FIG. 15 is a timing chart showing one example of test operation performed with a coarse adjustment instruction COARS held constant and a fine adjustment instruction FINE varied (in a faulty condition).

By contrast, in the example in FIG. 15, the comparison by the comparator 312E finds an abnormality in the change of the frequency of the clock signal CLK; thus the comparator 312E notifies the controller 303 of abnormality, and the controller 303 outputs the error flag raised from low to high to indicate abnormality.

Figure 16:
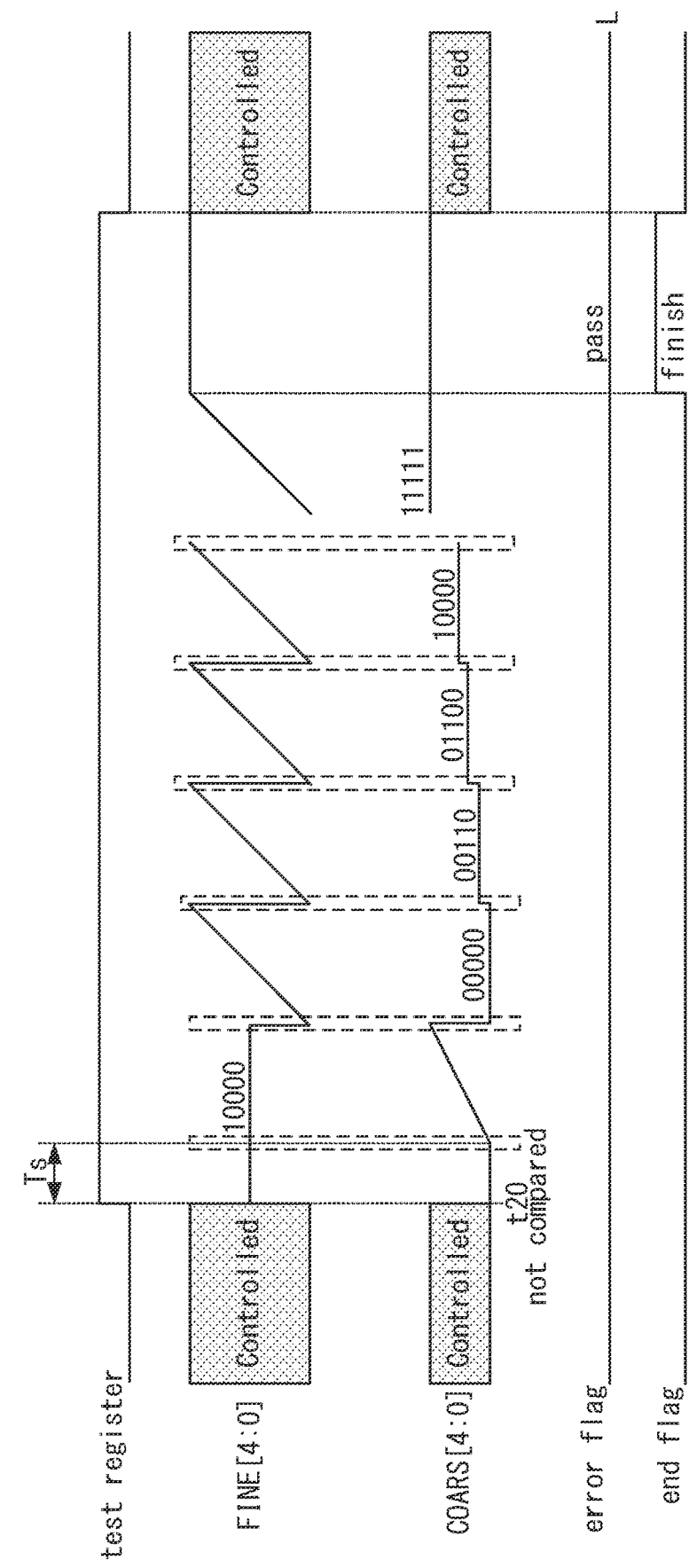
FIG. 16 is a timing chart showing one example of a code change pattern in a test using a second self-diagnosis circuit (in a normal condition).

FIG. 16 is a timing chart showing one example of a pattern of change of codes (the fine adjustment instruction FINE and the coarse adjustment instruction COARS) in a test using the second self-diagnosis circuit 312. As shown in FIG. 16, at timing t20, a switch takes place from normal operation to test operation, with the value of the fine adjustment instruction FINE set at "10000" and the value of the coarse adjustment instruction COARS set at "00000". After timing t20, at the lapse of the stabilization time Ts, the 11-bit counter 312A and the 13-bit counter 312B start counting, and the count values are stored in the previous data holder 312D. At this time, no comparison by the comparator 312E is performed.

Figure 18:
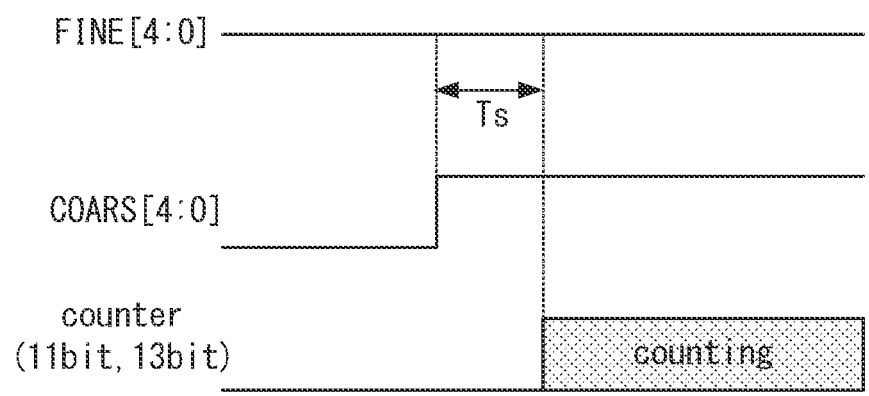
FIG. 18 is a diagram showing the timing of a start of counting with a fine adjustment instruction FINE held constant and a coarse adjustment instruction COARS varied.

Then, with the value of the fine adjustment instruction FINE held unchanged, the coarse adjustment instruction COARS is switched to "00001". Then, as shown in FIG. 18, after the timing that the coarse adjustment instruction COARS is switched, at the lapse of the stabilization time Ts, the 11-bit counter 312A and the 13-bit counter 312B start counting. Then the new count value in the 13-bit counter 312B is compared with the count value in the previous data holder 312D. Now, the new count value overwrites the previous data holder 312D to be stored there.

Thereafter, with the value of the fine adjustment instruction FINE held unchanged, the value of the coarse adjustment instruction COARS is switched sequentially up to "11111" and meanwhile count values are compared.

When the value of the coarse adjustment instruction COARS has been switched up to "11111", both the value of the fine adjustment instruction FINE and the value of the coarse adjustment instruction COARS are switched to "00000". At this time, no comparison by the comparator 312E is performed, and the count values are stored in the previous data holder 312D.

Figure 19:
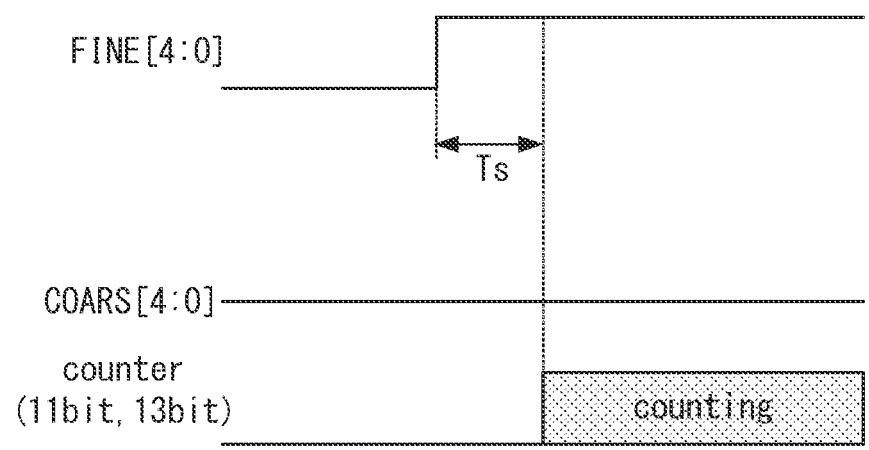
FIG. 19 is a diagram showing the timing of a start of counting with a coarse adjustment instruction COARS held constant and a fine adjustment instruction FINE varied.

Then, with the value of the coarse adjustment instruction COARS held unchanged, the value of the fine adjustment instruction FINE is switched to "00001". At this time, as shown in FIG. 19, after the timing that the value of the fine adjustment instruction FINE is switched, at the lapse of the stabilization time Ts, the 11-bit counter 312A and the 13-bit counter 312B start counting. Then, the new count value in the 13-bit counter 312B is compared with the count value in the previous data holder 312D. Now, the new count value overwrites the previous data holder 312D to be stored there.

Thereafter, with the value of the coarse adjustment instruction COARS held unchanged, the value of the fine adjustment instruction FINE is switched sequentially up to "11111" and meanwhile count values are compared. When the value of the fine adjustment instruction FINE has been switched up to "11111", the value of the fine adjustment instruction FINE is switched to "00000" and the value of the coarse adjustment instruction COARS is switched to "00110". At this time, no comparison by the comparator 312E is performed, and the count values are stored in the previous data holder 312D. Thereafter, with the value of the coarse adjustment instruction COARS held unchanged, the value of the fine adjustment instruction FINE is switched sequentially up to "11111" and meanwhile count values are compared.

Thereafter, in a similar manner, count values are compared while the value of the coarse adjustment instruction COARS is switched to "01100", to "10000", to "10110", to "11100", and to "11111" in this order and, during each period in which the value of the coarse adjustment instruction COARS remains constant, the value of the fine adjustment instruction FINE is switched.

Figure 17:
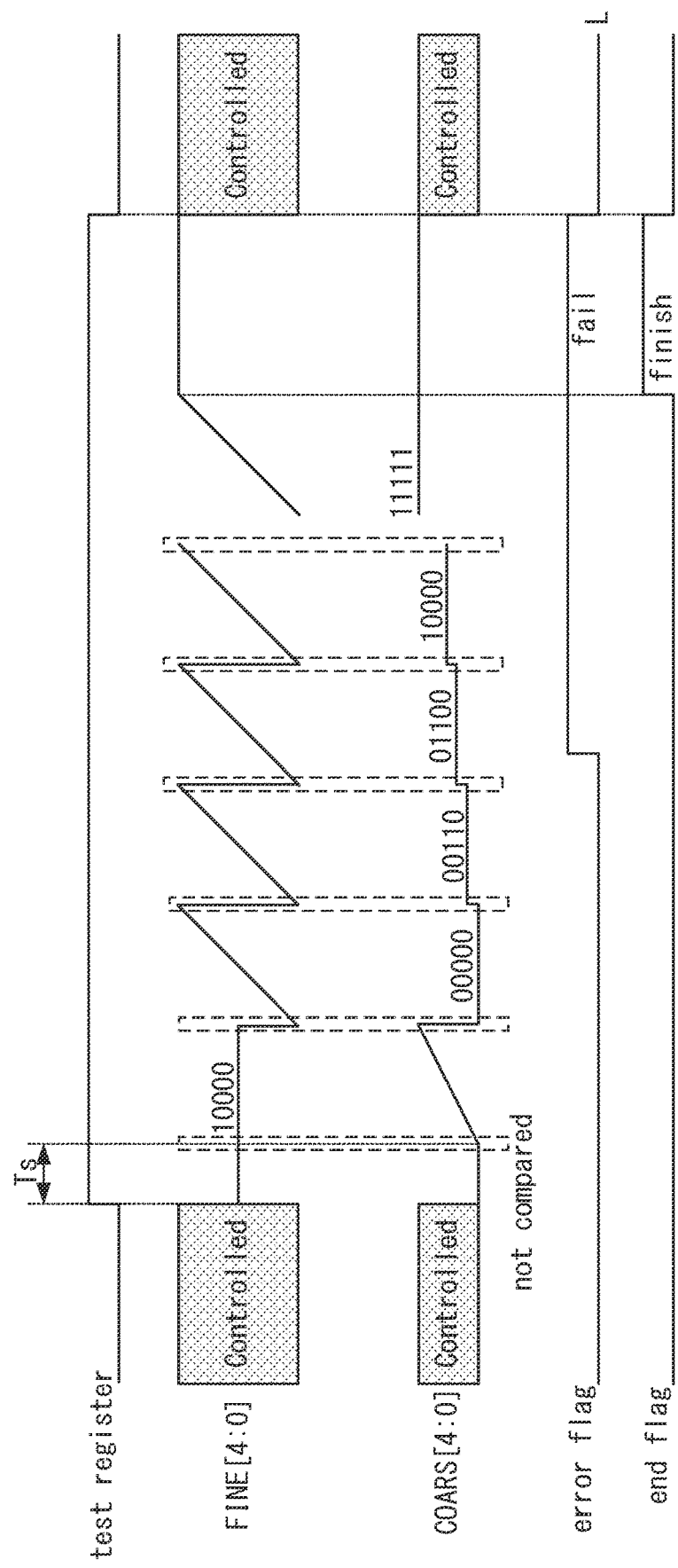
FIG. 17 is a timing chart showing one example of a code change pattern in a test using a second self-diagnosis circuit (in a faulty condition).

In the example in FIG. 16, where no abnormality is recognized in the comparison of count values in either of the codes, the error flag is held low. By contrast, in the example in FIG. 17, where abnormality is recognized in the comparison of count values during the period in which the value of the coarse adjustment instruction COARS is "01000", the error flag is switched from low to high.

<8. Terminal Arrangement on a Semiconductor Device>

The LED driving device 30 shown in FIG. 1 is a packaged product that has a rectangular shape as seen in a top view. Of two opposite sides of the rectangular shape, at one side is arranged the PWMIN terminal, and at the other side is arranged the PWMOUT terminal.

The PWMOUT terminal may be arranged at the same side as the FBV terminal, in which case it is preferable that at least one terminal be arranged between them. Likewise, the PWMOUT terminal may be arranged at the same side as the MINSELV terminal, in which case it is preferable that at least one terminal be arranged between them. That is, it is preferable that the PWMOUT terminal not be arranged adjacent to the FBV terminal or the MINSELV terminal.

This is because, whereas the signal that appears at the PWMOUT terminal is a rectangular-wave signal, the signals that appear at the FBV and MINSELV terminals are analog signals.

The PWMOUT terminal is a low-withstand-voltage terminal, and the PGND, SW, GH, BOOT, VIN, SNSP, SNSN, and COMP terminals are high-withstand-voltage terminals. This, with consideration given to the possibility of short-circuiting between terminals, it is preferable that at least one terminal be arranged between the PWMOUT terminal and any of those high-withstand-voltage terminals. That is, it is preferable that the PWMOUT terminal not be arranged adjacent to any of the above-mentioned high-withstand-voltage terminals.

The PWMOUT terminal may be arranged at the same side as any of the LED1 to LED24 terminals (e.g., the LED13 to LED24 terminals), in which case it is preferable that at least one terminal be arranged between them. That is, it is preferable that the PWMOUT terminal not be arranged adjacent to any of the above-mentioned LED terminals. This is because high voltages are applied to the LED terminals.

<9. Modifications>

The embodiment described above should be considered to be in every aspect illustrative and not restrictive; it should be understood that the technical scope of the present disclosure is defined not by the description of the embodiment given above but by the appended claims and encompasses any modifications made in a sense and scope equivalent to the claims.

INDUSTRIAL APPLICABILITY

The present disclosure finds applications in, as one example, drivers for vehicle-mounted LEDs.

REFERENCE SIGNS LIST 1 minimum voltage selector
2 reference voltage generator
3 spread spectrum reference voltage generator
4 frequency-voltage converter
5 error amplifier
6 ripple injector
7 amplifier
8 low-side comparator
9 high-side comparator
10 RS flip-flop
11 OCP circuit
12 driver logic circuit
13 diode
14 driver
15 SWOCP circuit
16 NMOS transistor
17 UVLO/TSD circuit
18 band gap reference circuit
19 internal voltage generator
20 internal voltage generator
21 fault notifier
22 NMOS transistor
23 I/O port
24 ring oscillator
24A DAC
24B error amplifier
24C NMOS transistor
24D resistor
24E AND circuit
24F selector 240 current feeder
241 mirror capacitance adjuster
25 control logic circuit
26 current driver
26A NMOS transistor
26B resistor
26C error amplifier
26D switch
27 short detector
28 open detector
30 LED driving device
300A to 300C semiconductor device system
301 selector
302 rising/falling edge detector
303 controller
304 frequency divider
305 PWM signal generator
306 register
307 frequency divider
308 8-bit counter
309 register
311 first self-diagnosis circuit
312 second self-diagnosis circuit
312A 11-bit counter
312B 13-bit counter
312C selector
312D previous data holder
312E comparator
40 CAN transceiver
45 MCU
50 wire harness
A1 to A24 LED array
N1 switching element
D1 diode
L1 inductor
R1 resistor
Co output capacitor
Cb boot capacitor
B battery voltage
P1 to P4 printed circuit board
INV1 to INV3 inverter
PM1 to PM5 PMOS transistors
NM1 to NM4 NMOS transistor
CU(1) to CU(31) capacitance unit
SW switch
C capacitor
BF buffer

The invention claimed is:

1. A semiconductor device comprising:
an oscillator configured to generate a first clock signal, wherein the oscillator is a ring oscillator that includes:
   an odd number of inverters;
   a DAC (DA converter) configured to perform DA conversion on a coarse adjustment instruction from the controller;
   a current feeder configured to pass through the inverters a current corresponding to an output of the DAC; and
   a mirror capacitance adjuster configured to change a capacitance value of a capacitance connected to a node among the inverters based on a fine adjustment instruction from the controller;
the semiconductor device further comprising:
   a first terminal via which an input clock signal is fed in from outside;
   a first counter configured to count a clock signal based on the first clock signal between edges in the input clock signal; and
   a controller configured to send to the oscillator an instruction to adjust a frequency of the first clock signal based on a result of comparison of a count value by the first counter with an expected value.

2. The semiconductor device according to claim 1, wherein
the mirror capacitance adjuster includes a plurality of capacitance units each including a capacitor and a switch arranged between the capacitor and the node, and
the semiconductor device further includes a first self diagnosis circuit configured to, while changing a pattern of the capacitance units in which the switch is turned on, apply low-level and high-level voltages to the node and compare outputs of the capacitance units with an expected value.

3. The semiconductor device according to claim 1, further comprising a second self diagnosis circuit including:
   a measurement circuit configured to measure a frequency of the first clock signal in test operation in which, of the coarse adjustment instruction and the fine adjustment instruction, one is held constant and another is changed; and
   a comparator configured to compare a result of measurement by the measurement circuit before and after a change in the instruction.

4. The semiconductor device according to claim 3, wherein
the second self diagnosis circuit includes a second counter of a predetermined bits configured to count a signal of a predetermined frequency, and
the measurement circuit is a third counter configured to count the first clock signal during a period in which the second counter counts the predetermined bits.

5. The semiconductor device according to claim 1, further comprising:
   a frequency divider configured to divide the first clock signal by a predetermined frequency division factor to generate a second clock signal;
   a selector configured to select and output either the input clock signal or the second clock signal as an output clock; and
   a second terminal via which the output clock is fed out to outside.

6. The semiconductor device according to claim 5, wherein the frequency divider includes:
   a first frequency divider configured to divide the first clock signal by a first frequency division factor; and
   a second frequency divider configured to divide an output of the first frequency divider by a second frequency division factor, and
   the first counter is configured to count the output of the first frequency divider.

7. The semiconductor device according to claim 5, wherein the frequency divider is configured to generate the second clock signal with a duty factor limited to a predetermined value.

8. The semiconductor device according to claim 5, wherein the selector is configured to be able to be set
   to select the input clock signal,
   to select the second clock signal, or
   not to output the output clock.

9. The semiconductor device according to claim 1, further comprising a PWM signal generator configured to generate a PWM signal based on the first clock signal.

10. The semiconductor device according to claim 9, wherein the PWM signal generator is configured to produce an edge in the PWM signal when an edge is detected in the input clock signal.

11. The semiconductor device according to claim 9, further comprising:
an LED terminal connectable to a cathode of an LED; and
a current driver configured to control a current passed to the LED terminal,
wherein the current driver is configured to be turned on and off in accordance with the PWM signal.

12. A semiconductor device system comprising a plurality of the semiconductor devices according to claim 11, wherein the semiconductor devices are each instructed on an on-duty factor of the PWM signal from outside via a CAN (controller area network) transceiver.

13. A semiconductor device system comprising:
a plurality of the semiconductor devices according to claim 5, wherein the second terminal of the semiconductor device in a preceding stage is connected to the first terminal of the semiconductor device in a succeeding stage.

14. The semiconductor device system according to claim 13, wherein the semiconductor device system is for vehicle onboard use.

* * * * *